United States Patent
Wang et al.

(10) Patent No.: US 11,207,635 B2
(45) Date of Patent: Dec. 28, 2021

(54) PROCESS FOR DEHUMIDIFYING MOIST GAS MIXTURES

(71) Applicant: Evonik Operations GmbH, Essen (DE)

(72) Inventors: Xinming Wang, Kanagawa-ken (JP); Caixuan Xu, Chiba-ken (JP); Rolf Schneider, Gruendau-Rothenbergen (DE); Matthias Bahlmann, Borken (DE); Thomas Kerl, Cologne (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/309,501

(22) PCT Filed: Nov. 29, 2019

(86) PCT No.: PCT/EP2019/083081
§ 371 (c)(1),
(2) Date: Jun. 2, 2021

(87) PCT Pub. No.: WO2020/114904
PCT Pub. Date: Jun. 11, 2020

(65) Prior Publication Data
US 2021/0362089 A1 Nov. 25, 2021

(30) Foreign Application Priority Data
Dec. 4, 2018 (WO) ............... PCT/EP2018/083485

(51) Int. Cl.
*B01D 53/14* (2006.01)
*B01D 53/28* (2006.01)
(Continued)

(52) U.S. Cl.
CPC ..... *B01D 53/1493* (2013.01); *B01D 53/1425* (2013.01); *B01D 53/263* (2013.01);
(Continued)

(58) Field of Classification Search
CPC ............ B01D 53/1493; B01D 53/1425; B01D 53/263; B01D 53/28; B01D 2252/30;
(Continued)

(56) References Cited

U.S. PATENT DOCUMENTS 7,304,200 B2   12/2007   Roettger et al.
8,696,928 B2   4/2014    Seiler et al.
(Continued)

FOREIGN PATENT DOCUMENTS

CN   102335545   2/2012
CN   107497252   12/2017
(Continued)

OTHER PUBLICATIONS

International Search Report dated Nov. 15, 2019 in PCT/EP2018/083485, 6 pages.
(Continued)

*Primary Examiner* — Anita Nassiri-Motlagh
(74) *Attorney, Agent, or Firm* — Grüneberg and Myers PLLC

(57) ABSTRACT

A process and an apparatus for dehumidifying a moist gas mixture are provided. The apparatus for dehumidifying a moist gas mixture can be used and in the process. The absorption medium used in the process and the apparatus is also provided.

28 Claims, 2 Drawing Sheets

(51) Int. Cl.
*B01D 53/26* (2006.01)
*C10L 3/10* (2006.01)
*F24F 3/14* (2006.01)

(52) U.S. Cl.
CPC ............ *B01D 53/28* (2013.01); *C10L 3/106* (2013.01); *B01D 2252/30* (2013.01); *B01D 2252/60* (2013.01); *C10L 2290/06* (2013.01); *C10L 2290/10* (2013.01); *C10L 2290/541* (2013.01); *F24F 3/1417* (2013.01)

(58) Field of Classification Search
CPC . B01D 2252/60; C10L 3/106; C10L 2290/06; C10L 2290/10; C10L 2290/541
USPC ........................................................... 95/194
See application file for complete search history.

(56) References Cited

U.S. PATENT DOCUMENTS

| | | | |
|---|---|---|---|
| 8,932,478 | B2 | 1/2015 | Seiler et al. |
| 9,878,285 | B2 | 1/2018 | Schraven et al. |
| 10,105,644 | B2 | 10/2018 | Zehnacker et al. |
| 10,493,400 | B2 | 12/2019 | Irfan et al. |
| 10,500,540 | B2 | 12/2019 | Zehnacker et al. |
| 10,512,881 | B2 | 12/2019 | Zehnacker et al. |
| 10,512,883 | B2 | 12/2019 | Zehnacker et al. |
| 2005/0090704 | A1 | 4/2005 | Roettger et al. |
| 2010/0016205 | A1 | 1/2010 | Schwab |
| 2010/0029519 | A1 | 2/2010 | Schwab et al. |
| 2011/0000236 | A1 | 1/2011 | Seiler et al. |
| 2011/0247494 | A1 | 10/2011 | Dinnage et al. |
| 2012/0247144 | A1 | 10/2012 | Seiler et al. |
| 2013/0031930 | A1 | 2/2013 | Seiler et al. |
| 2013/0031931 | A1 | 2/2013 | Seiler et al. |
| 2013/0219949 | A1 | 8/2013 | Seiler et al. |
| 2014/0356268 | A1 | 12/2014 | Schraven et al. |
| 2015/0308720 | A1 | 10/2015 | Zehnacker et al. |
| 2017/0354921 | A1 | 12/2017 | Zehnacker et al. |
| 2017/0354922 | A1 | 12/2017 | Zehnacker et al. |
| 2017/0354923 | A1 | 12/2017 | Zehnacker et al. |
| 2017/0354924 | A1 | 12/2017 | Irfan et al. |
| 2018/0135894 | A1 | 5/2018 | Zehnacker et al. |
| 2018/0169572 | A1 | 6/2018 | Zehnacker et al. |
| 2019/0021982 | A1 | 1/2019 | Iyoku |
| 2019/0170376 | A1 | 6/2019 | Wang et al. |

FOREIGN PATENT DOCUMENTS

| | | |
|---|---|---|
| CN | 108602930 | 9/2018 |
| DE | 10 2009 047 564 | 6/2011 |
| DE | 10 2010 004 779 | 7/2011 |
| EP | 2 087 930 | 8/2009 |
| EP | 2 380 940 | 10/2011 |
| EP | 2 636 715 | 9/2013 |
| EP | 3 257 569 | 12/2017 |
| TW | 201815457 | 5/2018 |
| WO | 2013/050230 | 4/2013 |
| WO | 2013/050242 | 4/2013 |
| WO | 2013/000637 | 1/2015 |

OTHER PUBLICATIONS

International Search Report dated Feb. 17, 2020 in PCT/EP2019/083081, 6 pages.
Written Opinion dated Nov. 15, 2019 in PCT/EP2018/083485, 7 pages.
Written Opinion dated Feb. 17, 2020 in PCT/EP2019/083081, 6 pages.
U.S. Pat. No. 7,304,200, filed Dec. 4, 2007, 2005/0090704, Roettger et al.
U.S. Pat. No. 8,932,478, filed Jan. 13, 2015, 2011/0000236, Seiler et al.
U.S. Appl. No. 12/363,960, filed Feb. 2, 2009, 2010/0029519, Schwab et al.
U.S. Appl. No. 12/503,938, filed Jul. 16, 2009, 2010/0016205, Peter Schwab.
U.S. Pat. No. 8,696,928, filed Apr. 15, 2014, 2012/0247144, Seiler et al.
U.S. Appl. No. 13/641,591, filed Oct. 16, 2012, 2013/0031930, Seiler et al.
U.S. Appl. No. 13/641,692, filed Oct. 16, 2012, 2013/0031931, Seiler et al.
U.S. Appl. No. 13/883,573, filed May 5, 2013, 2013/0219949, Seiler et al.
U.S. Pat. No. 9,878,285, filed Jan. 30, 2018, 2014/0356268, Schraven et al.
U.S. Appl. No. 14/646,516, filed May 21, 2015, 2015/0308720, Zehnacker et al.
U.S. Appl. No. 15/868,396, filed Jan. 11, 2018, 2018/0135894, Zehnacker et al.
U.S. Pat. No. 10,500,540, filed Dec. 10, 2019, 2018/0169572, Zehnacker et al.
U.S. Pat. No. 10,105,644, filed Oct. 23, 2018, 2017/0354922, Zehnacker et al.
U.S. Pat. No. 10,493,400, filed Dec. 3, 2019, 2017/0354924, Irfan et al.
U.S. Pat. No. 10,512,883, filed Dec. 24, 2019, 2017/0354923, Zehnacker et al.
U.S. Appl. No. 16/300,466, filed Nov. 9, 2018, 2019/0170376, Wang et al.
U.S. Pat. No. 10,512,881, filed Dec. 24, 2019, 2017/0354921, Zehnacker et al.
Luo et al, "Dehumidification performance of [EMIM]BF4", *Applied Thermal Engineering*, 31 (2011), 2772-2777.
Luo et al, "Investigation on feasibility of ionic liquids used in solar liquid desiccant air conditioning system," *Solar Energy*, 86 (2012), 2718-2724.

PROCESS FOR DEHUMIDIFYING MOIST GAS MIXTURES

CROSS-REFERENCE TO RELATED APPLICATIONS

This application is the National Stage entry under § 371 of International Application No. PCT/EP2019/083081, filed on Nov. 29, 2019, and which claims the benefit of European Application No. PCT/EP2018/083485, filed on Dec. 4, 2018. The content of each of these applications is hereby incorporated by reference in its entirety.

BACKGROUND OF THE INVENTION

Field of the Invention

The invention relates to a process for dehumidifying a moist gas mixture. The invention further relates to an apparatus for dehumidifying a moist gas mixture and to the use of said apparatus in the process according to the invention. The invention also relates to the absorption medium used in the process and the apparatus.

Description of Related Art

Dehumidification of moist gas mixtures is necessary in a multitude of technical fields.

For instance ventilation and air conditioning of buildings or vehicles generally necessitates not only cooling but also dehumidification of the air since the air to be cooled is often so humid that during cooling to the desired temperature the temperature falls below the dew point temperature. Hence in conventional air conditioning systems dehumidification of the air accounts for a large part of the electricity consumption.

The electricity consumption of air conditioning systems for buildings is reduced by dehumidifying the air by adsorption or absorption of water with a drying medium and subsequently regenerating the water-laden drying medium by heating to a temperature at which the water is desorbed again. Compared to adsorption on a solid adsorbent, the advantage of absorption in a liquid absorption medium is that drying of air can be performed with reduced equipment complexity and with less drying medium and that regeneration of the water-laden drying medium using solar heat is easier to carry out.

A further technical field where dehumidifying of moist gas mixtures is employed is the field of absorption chillers (principle described in WO 2014/079675 A1; according to the invention "absorption chiller" is used synonymously with "absorption heat pump"). Here, the damp gas mixture is formed during evaporation of water under low pressure. The water vapour thus formed needs to be removed from the moist gas mixture so that said mixture may then be returned to the water evaporation to pass through a new cycle. Here too, absorption in a liquid absorption medium is favoured over adsorption on a solid adsorption medium.

Finally, dehumidification of moist gas mixtures is also important in the field of natural gas extraction, as described in DE 10 2010 004 779 A1 for example.

Examples of materials incorporated in air or natural gas dehumidifying plants and in chillers include titanium, copper and noble metals. Components based on aluminium too are installed in air dehumidifying plants. Compared to alternative materials such as titanium, copper or stainless steel, aluminium has the advantage that it has a higher thermal conductivity. It is additionally easier to process, lighter and cheaper. Hence in automobile manufacture in particular air conditioning systems made of aluminium are preferred over other materials.

The aqueous solutions of lithium bromide, lithium chloride or calcium chloride hitherto employed as liquid absorption media in commercial air conditioning systems have the disadvantage that they are corrosive towards the materials of construction typically employed in air conditioning systems and that they thus necessitate the use of expensive specific materials of construction. This problem is encountered particularly for aluminium. These solutions can additionally cause problems due to salt crystallizing out of the absorption medium.

Y. Luo et al., Appl. Thermal Eng. 31 (2011) 2772-2777 proposes using the ionic liquid 1-ethyl-3-methylimidazolium tetrafluoroborate in place of an aqueous solution of lithium bromide for drying of air. However, this ionic liquid has the disadvantage of only poor absorption capability.

Y. Luo et al., Solar Energy 86 (2012) 2718-2724 proposes using the ionic liquids 1,3-dimethyimidazolium acetate as an alternative to 1-ethyl-3-methylimidazolium tetrafluoroborate for drying of air. However, 1,3-dimethyimidazolium acetate is not stable and decomposes to a not inconsiderable extent during desorption.

This problem is also encountered for the ionic liquids proposed in US 2011/0247494 A1, paragraph [0145]. This document proposes using trimethylammonium acetate or 1-ethyl-3-methylimidazolium acetate as liquid drying agent in place of aqueous lithium chloride solution. Example 3 compares water uptake from moist air for a series of further ionic liquids.

CN 102335545 A describes aqueous solutions of ionic liquids that do not suffer from the abovementioned problems as absorption media for air dehumidification. The absorption media are reported to be noncorrosive toward steel. Ionic liquids described are, inter alia, 1,3-dimethyimidazolium dimethylphosphate, 1-ethyl-3-methylimidazolium dimethylphosphate and 1-butyl-3-methylimidazolium dimethylphosphate. CN 102335545 A is chiefly concerned with steel-based air dehumidifiers. Yet this material is less favourable compared to aluminium for the abovementioned reasons. Additionally the heat transfer achieved with the ionic liquids cited in CN 102335545 A, which is important for efficient air dehumidification, was relatively low.

Yet, heat transfer is an important parameter which must be accounted for when choosing absorption media. Thus, in the field of air dehumidification absorption, media which ensure a particularly good heat transfer between themselves and further constituents of an air dehumidifier are particularly readily employable. In air dehumidifiers in which metallic components (for example aluminium) are employed, this heat transfer takes place at least partially between the absorption media and metallic surfaces.

In this context, the better the wetting performance is on the metal surfaces, the higher the heat/mass transfer capability becomes. As a result, higher dehumidifying capacity and higher efficiency are obtained. Ionic liquids are very useful as the absorption media (absorbent) because they are non-corrosive to some metals. On the other hand, as ionic liquids have relatively higher viscosity than inorganic based absorbents, to realize the better mass transfer and heat transfer, effective additives to enhance the wetting capability of the ionic liquid need to be developed.

SUMMARY OF THE INVENTION

The purpose of this invention is to create the best formulation, which consists of the non-corrosive ionic liquid and wetting additives.

In this context, DE 10 2016 210 478 A1 describes absorption media which are particularly suitable for applications in apparatuses containing aluminium surfaces. The prior art which uses additives such as trialkyl phosphate can reduce the surface tension of waterborne system. However, the reduction of surface tension and contact angle are limited. Moreover, the trialkyl phosphates are prone to hydrolyse, and the resulting products such as dialkyl phosphoric acid may cause corrosion.

Likewise, in case of anionic additives, their surface active ability is easily influenced by pH.

Therefore, even though these prior art absorption media can advantageously be used for this purpose, there is still a demand in the art for other absorption media that display such advantageous behaviour and even provide better heat transfer.

The present invention accordingly has for its object to further provide absorption media that solve these problems and in particular ensure improved heat transfer compared with prior art absorption media when used in air conditioning systems, air dehumidifiers, absorption chillers etc., and in particular aluminium-based air conditioning systems.

Absorption media have now been found which, surprisingly, fulfil this object.

Figure 1:
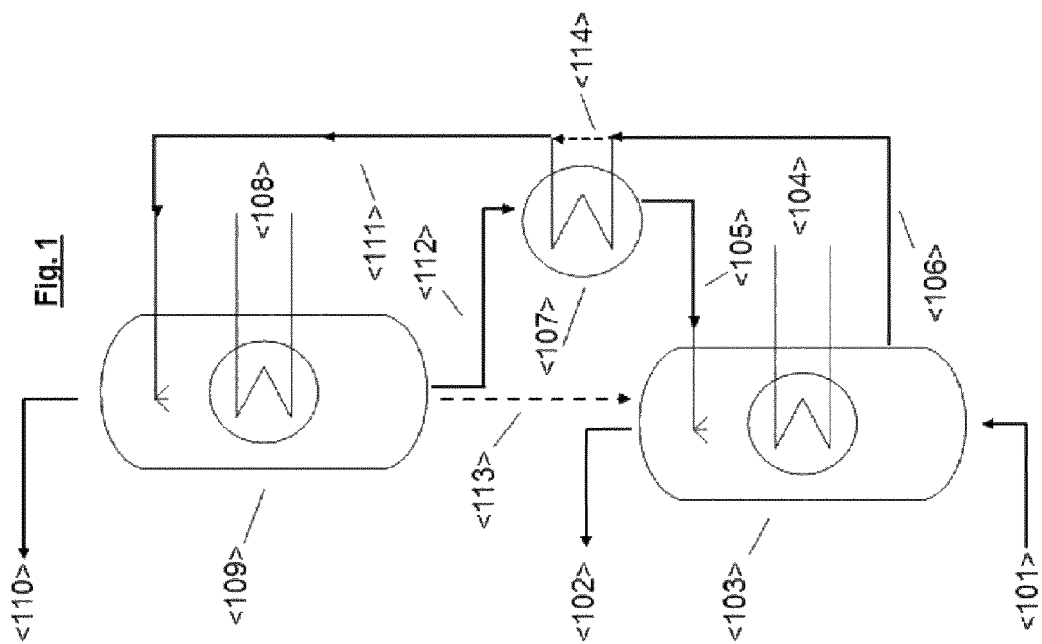
FIG. 1 shows an embodiment of the apparatus V2/V1 according to the invention.

DETAILED DESCRIPTION OF THE INVENTION 2.1 Compounds According to Structure (II)

The present invention accordingly relates in a first aspect to a process for dehumidifying a moist gas mixture G, in particular moist air, in an apparatus $V_1$, comprising the steps of:
(a) contacting the moist gas mixture G with a liquid absorption medium $A_{VE}$ comprising a mixture of at least one additive selected from the group consisting of compounds of the structure (II) with

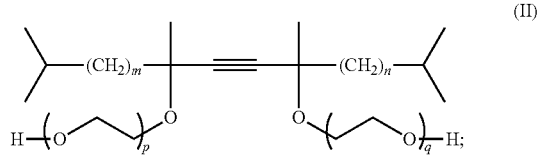

(II)

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein the liquid absorption medium $A_{VE}$ at least partially absorbs water from the moist gas mixture G, to obtain a liquid absorption medium $A_{VE1}$ having an elevated water content compared to the liquid absorption medium $A_{VE}$ and a gas mixture $G_1$ having a relatively low water content compared to the moist gas mixture G, (b) at least partially removing water from the liquid absorption medium $A_{VE1}$ to obtain a liquid absorption medium $A_{VE2}$ having a relatively low water content compared to the liquid absorption medium $A_{VE1}$, wherein the apparatus $V_1$ at least partially comprises a surface made of a metal material of construction $O_{AI}$ and in the apparatus $V_1$ at least one of the liquid absorption media selected from the group consisting of $A_{VE}$, $A_{VE1}$, $A_{VE2}$ contacts the surface made of a metal material of construction $O_{AI}$ via at least one contact surface, characterized in that $Q^+$ is a dialkylimidazolium cation in which, in particular, the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, and wherein M+ is an alkali metal ion, preferably $Li^+$, $K^+$ or $Na^+$, more preferably $K^+$ or $Na^+$, and wherein m and n are independently of each other integral numbers in the range of 0 to 3, preferably 0 to 2, and wherein p and q are independently of each other integral numbers in the range of 0 to 30, wherein the sum of p+q is an integral number in the range of 0 to 30, and more preferably p and q are independently of each other integral numbers in the range of 0 to 10, wherein the sum of p+q is an integral number in the range of 0 to 10, and wherein the metal is selected from the group consisting of aluminium, steel, copper, noble metals, titanium, more preferably selected from the group consisting of aluminium, platinum, and wherein the metal most preferably is aluminium.

The gas mixture G is not particularly restricted. "Moist" is to be understood as meaning in the context of the invention "comprising water, in particular water vapour". "Dehumidifying" is to be understood as meaning at least partially removing water.

"At least partially" is to be understood as meaning in the context of the invention "partially or completely".

"Moist gas mixture G" is accordingly to be understood as meaning in the context of the invention that the gas mixture G comprises water, preferably water vapour ("water vapour" is to be understood as meaning water in the gaseous physical state), and that its composition is otherwise not particularly restricted. The water content of this moist gas mixture is not particularly restricted and is in particular from 0.01 vol.-% to 99.99 vol.-% ("vol.-%" indicates the volume of water vapour based on the overall volume of moist gas mixture G). The composition of the moist gas G may otherwise vary depending on the application of the process according to the invention. The moist gas mixture G is in particular selected from moist natural gas, moist air (this may be moist indoor air or the moist air resulting from evaporation of water in absorption chillers), preferably moist air. For moist natural gas the water content is in particular from 0.01 vol.-% to 15.00 vol.-%, for moist air said content is in particular from 0.01 vol.-% to 15.00 vol.-% in the case of moist indoor air or in particular from 95.00 vol.-% to 99.99 vol.-% which is the preferred range when moist air resulting from evaporation of water in absorption chillers is concerned.

A "dialkyl imidazolium" cation according to the invention is preferably a 1,3-dialkylimidazolium cation.

"Integral number in the range of 1 to 5" is to be understood as meaning in the context of the invention all integral numbers 1, 2, 3, 4, and 5, i.e. including the two limits 1 and 5.

"Integral number in the range of 1 to 6" is to be understood as meaning in the context of the invention all integral numbers 1, 2, 3, 4, 5, and 6, i.e. including the two limits 1 and 6.

"Integral number in the range of 1 to 8" is to be understood as meaning in the context of the invention all integral numbers 1, 2, 3, 4, 5, 6, 7, and 8, i.e. including the two limits 1 and 8.

"Integral number in the range of 0 to 2" is to be understood as meaning in the context of the invention all integral numbers 0, 1, and 2, i.e. including the two limits 0 and 2.

"Integral number in the range of 0 to 3" is to be understood as meaning in the context of the invention all integral numbers 0, 1, 2, and 3, i.e. including the two limits 0 and 3.

"Integral number in the range of 0 to 30" is to be understood as meaning in the context of the invention all integral numbers 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, i.e. including the two limits 0 and 30.

"Integral number in the range of 0 to 10" is to be understood as meaning in the context of the invention all integral numbers 0, 1, 2, 3, 4, 5, 6, 7, 8, 9, and 10, i.e. including the two limits 0 and 10.

"Integral number in the range of 0 to 5" is to be understood as meaning in the context of the invention all integral numbers 0, 1, 2, 3, 4, and 5, i.e. including the two limits 0 and 5.

"Integral number in the range of 1 to 15" is to be understood as meaning in the context of the invention all integral numbers 1, 2, 3, 4, 5, 6, 7, 8, 9, 10, 11, 12, 13, 14, and 15, i.e. including the two limits 1 and 15.

The condition "wherein p and q are independently of each other integral numbers in the range of 0 to 30, wherein the sum of p+q is an integral number in the range of 0 to 30" means that for each of p and q both conditions have to be fulfilled, i.e. p has to be an integral number between 0 and 30, and q has to be an integral number between 0 and 30, and the choice of p and q has to be so that their sum is in the range of 0 to 30.

The condition "wherein p and q are independently of each other integral numbers in the range of 0 to 10, wherein the sum of p+q is an integral number in the range of 0 to 10", means that for each of p and q both conditions have to be fulfilled, i.e. p has to be an integral number between 0 and 10, and q has to be an integral number between 0 and 10, and the choice of p and q has to be so that their sum is in the range of 0 to 10.

The process according to the invention is carried out in an apparatus $V_1$ which at least partially comprises a surface made of a metal material of construction $O_{AI}$ (in the context of the invention $O_{AI}$ is short for "surface made of a metal material of construction") and in which at least one of the liquid absorption media selected from the group consisting of $A_{VE}$, $A_{VE1}$, $A_{VE2}$ contacts the surface made of a metal material of construction $O_{AI}$ via at least one contact surface.

It was surprisingly found that the absorption media according to the present invention display lower surface tension in comparison to the pure ionic liquid. In addition, it was surprisingly observed that the contact angle between the absorption medium according to the present invention and aluminium is lower than for the pure ionic liquid, thus favouring good heat transfer.

Accordingly, the metal of the material of construction $O_{AI}$ is selected from the group consisting of aluminium, steel, copper, noble metals, titanium, more preferably selected from the group consisting of aluminium, platinum, and most preferably is aluminium.

Preferred steel material according to the invention is stainless steel.

Preferred noble metals according to the invention are selected from the group consisting of platinum, gold, silver. The most preferred nobel metal is platinum.

It is in particular possible to employ an apparatus $V_1$ having the following components:
(i) at least one water absorption unit $W_{abs1}$ set up for contacting the moist gas mixture with the liquid absorption medium $A_{VE}$,
(ii) at least one water desorption unit $W_{des1}$ which comprises a heat exchanger $W_{x1}$ and is set up for at least partially removing water from a liquid absorption medium $A_{VE}$,
(iii) and a circuit $U_1$ which connects the water absorption unit $W_{abs1}$ with the water desorption unit $W_{des1}$ and by means of which the liquid absorption medium $A_{VE}$ may be circulated.

The water absorption unit $W_{abs1}$ is the component in which step a) of the process according to the invention in particular is carried out. Employable as water absorption unit $W_{abs1}$ are in particular the water absorbers known to those skilled in the art. Said absorbers are based on the principle of increasing the surface area of the liquid absorption medium $A_{VE}$ and simultaneously achieving the longest possible residence time of the liquid absorption medium $A_{VE}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films. The water absorption unit $W_{abs1}$ may in particular also comprise an additional heat exchanger $W_{z1}$ set up such that the liquid absorption medium $A_{VE}$ is coolable.

The water desorption unit $W_{des1}$ which comprises a heat exchanger $W_{x1}$ is the unit in which step b) of the process according to the invention in particular is carried out. The water desorption unit $W_{des1}$ is based on the principle of supplying heat to the water-laden liquid absorption medium $A_{VE}$ (in particular $A_{VE1}$), increasing the surface area of the water-laden liquid absorption medium $A_{VE}$ (in particular $A_{VE1}$) and simultaneously achieving the longest possible residence time of the water-laden liquid absorption medium $A_{VE}$ (in particular $A_{VE1}$) in the water desorption unit.

Employable as water desorption unit $W_{des1}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des1}$ comprising a heat exchanger $W_{x1}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des1}$ falling-films, in particular shell and tube falling-films.

Circuit $U_1$ in particular passes $A_{VE1}$ from step a) of the process according to the invention from the water absorption unit $W_{abs1}$ to the water desorption unit $W_{des1}$ and more preferably—in particular when the process according to the invention is carried out in continuous fashion—additionally passes $A_{VE2}$ from step b) of the process according to the invention from the water absorption unit $W_{des1}$ to the water desorption unit $W_{des1}$.

The circuit $U_1$ is in particular a conduit, in particular selected from the group consisting of tube, hose.

In a further preferred embodiment the circuit $U_1$ also comprises a pump.

A first step of the process according to the invention comprises contacting the moist gas mixture G with a liquid absorption medium $A_{VE}$ comprising a mixture of at least one additive selected from the group consisting of compounds of the structure (II) with

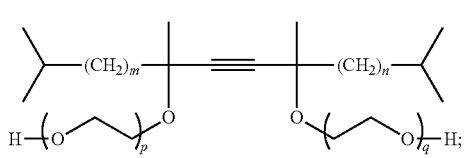

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$. The contacting may be effected in any way known to those skilled in the art, in particular in a water absorption unit $W_{abs1}$. The contacting causes the absorption medium $A_{VE}$ to at least partially absorb moisture, i.e. water, from the moist gas stream G to afford a liquid absorption medium $A_{VE1}$ having an elevated water content compared to the liquid absorption medium $A_{VE}$ and a gas mixture $G_1$ having a relatively low water content compared to the moist gas mixture G.

It is preferable to cool the absorption medium $A_{VE}$ during contacting of the moist gas mixture G in order that as much moisture as possible is absorbed from the moist gas mixture G. This may be achieved, for example, via an additional heat exchanger $W_{z1}$ in the water absorption unit $W_{abs1}$. The temperature of the absorption medium $A_{VE}$ during contacting of the moist gas mixture G is thus preferably in the range of from 2° C. to 100° C., preferably from 3° C. to 80° C., more preferably from 4° C. to 50° C., most preferably from 5° C. to 30° C.

The absorption medium $A_{VE}$ comprises a mixture of at least one additive selected from the group consisting of compounds of the structure (II) with

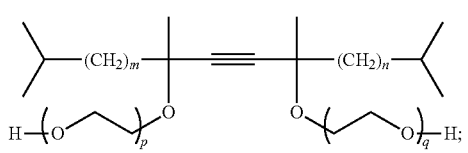

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein $Q^+$ is a dialkylimidazolium cation in which in particular the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, and wherein $M^+$ is an alkali metal ion, preferably $Li^+$, $K^+$ or $Na^+$, yet more preferably $K^+$ or $Na^+$, and wherein m and n are independently of each other integral numbers in the range of 0 to 3, and wherein p and q are independently of each other integral numbers in the range of 0 to 30, wherein the sum of p+q is an integral number in the range of 0 to 30.

In a preferred embodiment of the process according to the invention the salt S is selected from the group consisting of $Q^+A^-$, $Q^+(R^1O)_2PO_2^-$, preferably the salt S is $Q^+(R^1O)_2PO_2^-$, and $Q^+$ is a dialkylimidazolium cation in which the alkyl groups each independently of one another have 1 to 6, preferably 1 or 4, more preferably 1 or 2 carbon atoms, and $A^-$ is an anion selected from the group consisting of $R^*COO^-$, $R'SO_3^-$, $R''SO_4^-$, wherein $R^*$, $R^1$, $R'$, $R''$, are each independently of one another an alkyl group having 1 to 6, preferably 1 to 4, more preferably 1 or 2, carbon atoms.

In a more preferred embodiment of the process according to the invention, the salt S has the general formula $Q^+(R^1O)_2PO_2^-$, and $Q^+$ is a dialkylimidazolium cation in which the alkyl groups are each independently of one another selected from the group consisting of methyl, ethyl, butyl, even more preferably selected from the group consisting of methyl or ethyl, and $R^1$ is methyl or ethyl.

In a yet more preferred embodiment of the process according to the invention, the salt S has the general formula $Q^+(R^1O)_2PO_2^-$, and $Q^+$ is selected from the group consisting of 1,3-dimethylimidazolium, 1,3-diethylimidazolium, 1-ethyl-3-methylimidazolium; $R^1$ is methyl or ethyl. Most preferably, the salt S is 1-ethyl-3-methylimidazolium diethylphosphate.

It has now been found that, surprisingly, the mixtures of the above mentioned salts S display a lower surface tension and have a particularly small contact angle with aluminium and thus ensure particularly good surface wetting when at least one additive selected from the group consisting of compounds of the structure (II) is added. This results in a relatively large contact area, thus also in fewer nonwetted spaces and thus in improved heat transfer inside the apparatus $V_1$ and thus also in a particularly efficient process.

The compounds of the structure (II) of the liquid absorption medium $A_{VE}$ can be described as acetylenic glycol compounds which optionally are ethoxylated. They are known to the skilled person and can be synthesized from the ethylene oxide and the acetylenic tertiary glycols by promoting of basic catalysts, for example described in U.S. Pat. No. 3,268,593. In structure (II), m and n are independently of each other integral numbers in the range of 0 to 3, preferably 0 to 2, and p and q are independently of each other integral numbers in the range of 0 to 30, wherein the sum of p+q is an integral number in the range of 0 to 30. More preferably, p and q are independently of each other integral numbers in the range of 0 to 10, wherein the sum of p+q is an integral number in the range of 0 to 10.

Most preferred are compounds of structure (II) in which m=n=2 and p and q are independently of each other integral numbers in the range of 0 to 4, wherein the sum of p+q is an integral number in the range of 0 to 4.

As stated above, it has been found that the addition of one of the compounds selected from the group consisting of the compounds of structure (II) to the salt S provides advantageous properties.

In the process according to the invention, the liquid absorption medium $A_{VE}$ is preferably an aqueous solution in which, in particular, the total weight of all compounds of the structure (II) and all salts S is in the range from 20.1 wt.-% to 92 wt.-% based on the total weight of the aqueous solution. It is yet more preferable when the total weight of all compounds of structure (II) and all salts S in $A_{VE}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the process according to the invention the ratio of all compounds of the structure (II) to the salts S in the absorption medium $A_{VE}$ is not further restricted. However, it is preferable to employ in the process according to the invention an absorption medium $A_{VE}$ in which the ratio of the total weight of all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

In a more preferred embodiment according to the present invention, the absorption medium $A_{VE}$ comprises at least one salt S as described above, at least one compound of structure (II) and at least one compound of structure (I) with

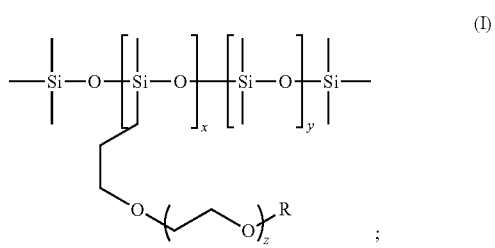

(I)

wherein R is hydrogen or methyl,
and wherein x is an integral number in the range of 1 to 5,
wherein y is an integral number in the range of 0 to 5,
and wherein z is an integral number in the range of 1 to 15, preferably 1 to 8, and wherein preferably the sum of x+y is an integral number in the range of 1 to 6.

In the cases where x>1, the value of z in the x units in structure (I) can be the same or different.

In a preferable embodiment, in structure (I), x is an integral number in the range of 1 to 5, and y is an integral number in the range of 0 to 5, and z is an integral number in the range of 1 to 8, and the sum of x+y is an integral number in the range of 1 to 6.

The compounds of the structure (I) can be described as siloxane compounds. Such compounds are known to the skilled person and can be synthesized from a catalytic hydrosilylation process, which describes the addition of Si—H bonds to unsaturated bonds. Such process is e.g. described on pages 466/467 of N. N. Greenwood, A. Earnshaw, Chemie der Elemente, corrected print of the 1$^{st}$ edition, VCH, 1990, Weinheim, Basel, Cambridge, N.Y. (translated into German by Hückmann).

When the absorption medium $A_{VE}$ comprises at least one compound of structure (I) and at least one compound of structure (II), it is further preferred that the ratio of the total weight of all compounds of structure (I) to the total weight of all compounds of structure (II) is in the range of 3:1 to 1:3, and preferably is 1:1.

The liquid absorption medium $A_{VE}$ may, in the process according to the invention, be employed in the form of the pure mixture of the salts S with the compounds of the structure (II) and, optionally, compounds of the structure (I). More preferably in the process according to the invention, the liquid absorption medium $A_{VE}$ is an aqueous solution in which, in particular, the total weight of all compounds of structure (I), and all compounds of the structure (II), and all salts S is in the range from 20.1 wt.-% to 92 wt.-% based on the total weight of the aqueous solution. It is yet more preferable when the total weight of all compounds of structure (I), all compounds of structure (II), and all salts S in $A_{VE}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the process according to the invention the ratio of all compounds of structure (II) and optionally all compounds of the structure (I) to the salts S in the absorption medium $A_{VE}$ is not further restricted. However, it is preferable to employ in the process according to the invention an absorption medium $A_{VE}$ in which the ratio of the total weight of all compounds of structure (I) and all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

The gas mixture $G_1$ obtained in the first step of the process according to the invention and having a relatively low water content compared to the moist gas mixture G then represents the dehumidified gas stream which, depending on the application, can be returned to living or working spaces in the form of dehumidified air or in the case of natural gas can be supplied to power generation.

The absorption medium $A_{VE1}$ obtained in the first step of the process according to the invention has an elevated water content compared to the liquid absorption medium $A_{VE}$. It will be appreciated that $A_{VE1}$, in terms of the compounds of structure (II) and optionally of structure (I) comprised in it and of the salts S comprised in it, is identical to $A_{VE}$ and is preferably distinguished therefrom only by the water content.

A second step of the process according to the invention comprises at least partially removing water from the liquid absorption medium $A_{VE}1$ to obtain a liquid absorption medium $A_{VE2}$ having a relatively low water content compared to the liquid absorption medium $A_{VE}1$. This additionally comprises supplying heat in particular to the liquid absorption medium $A_{VE}1$. The supply of heat and the at least partial removal may be effected in any way known to those skilled in the art, in particular in a water desorption unit $W_{des1}$ comprising a heat exchanger $W_{x1}$. The at least partial removal of water from the liquid absorption medium $A_{VE1}$ affords a liquid absorption medium $A_{VE2}$ having a relatively low water content compared to the liquid absorption medium $A_{VE1}$.

It will be appreciated that the liquid absorption medium $A_{VE2}$, in terms of the compounds of structure (II) and optionally of structure (I) comprised in it and of the salts S comprised in it, is identical to $A_{VE1}$ and is preferably distinguished therefrom only by the water content.

An essential feature of the process according to the invention is that the apparatus $V_1$ at least partially comprises a surface made of a metal material of construction $O_{AI}$ (in the context of the invention $O_{AI}$ is an abbreviation for "surface made of a metal material of construction").

Accordingly, the metal of the material of construction $O_{AI}$ is selected from the group consisting of aluminium, steel, copper, noble metals, titanium, more preferably selected from the group consisting of aluminium, platinum, and most preferably is aluminium.

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular aluminium having a purity of >80 wt.-%, more preferably >85 wt.-%, yet more preferably >90 wt.-%, yet still more preferably >95 wt.-%, yet still more preferably >98 wt.-%. It is in particular highest purity aluminium having a purity of >99.0 wt.-%, more preferably >99.5 wt.-%, more preferably >99.9 wt.-%.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may then in particular be in the form of a wrought alloy or of a cast alloy.

A "steel material of construction" in the context of the present invention is to be understood as meaning in particular any iron alloy where the mass fraction of iron is greater than the mass fraction of every other element present. The proportion of iron in the steel material of construction is preferably >50 wt.-%, more preferably ≥60 wt.-%, yet more preferably ≥70 wt.-%, yet more preferably ≥80 wt.-%, yet more preferably ≥99 wt.-%. In accordance with the invention in addition to iron the steel material of construction comprises in particular at least one alloying metal selected from the group consisting of nickel, chromium, vanadium, molybdenum, niobium, tungsten, cobalt, magnesium, manganese, silicon, zinc, lead, copper, titanium, more preferably selected from the group consisting of nickel, chromium, vanadium, molybdenum, niobium, tungsten, cobalt, magnesium, manganese, titanium, particularly chromium, wherein this yet more preferably has a mass fraction in the steel material of construction 20 greater than 10.5 wt.-% but smaller than 50 wt.-%. It is yet more preferable when at the same time the carbon content in the steel material of construction is then always <2.06 wt.-%, yet more preferably ≤1.2 wt.-%. It will be appreciated that the sum of the contents of iron, alloying metal (for example chromium) and carbon in the steel material of construction must not exceed 100 wt.-%. 25 The steel material of construction may in particular be in the form of a wrought alloy or of a cast alloy.

An platinum material of construction in the context of the present invention is to be understood as meaning both unalloyed platinum and platinum alloys where in particular the mass fraction of platinum is greater than the mass fraction of every other element. The platinum material of construction is preferably unalloyed platinum.

Unalloyed platinum is in particular platinum having a purity of >80 wt.-%, more preferably >85 wt.-%, yet more preferably >90 wt.-%, yet still more preferably >95 wt.-%, yet still more preferably >98 wt.-%. It is in particular highest purity platinum having a purity of >99.0 wt.-%, more preferably >99.5 wt.-%, more preferably >99.9 wt.-%.

Platinum alloys comprise in addition to the platinum in particular at least one alloying metal selected from the group consisting of magnesium, manganese, silicon, zinc, lead, copper, titanium, iron, more preferably selected from the group consisting of magnesium, manganese, silicon, zinc, lead, copper, titanium.

The description for platinum applies mutatis mutandis for other noble metals such as silver, gold, and also for other metals such as copper, titanium.

A further essential feature of the process according to the invention is that in the apparatus $V_1$ at least one of the liquid absorption media selected from the group consisting of $A_{VE}$, $A_{VE1}$, $A_{VE2}$ contacts the surface made of a metal, preferably, aluminium, material of construction $O_{AI}$ via at least one contact surface. This is to be understood as meaning that at this contact surface the liquid absorption medium $A_{VE}$ in question, $A_{VE1}$ or $A_{VE2}$, is in direct contact with the surface made of a metal, preferably aluminium, material of construction $O_{AI}$. In the context of the present invention "in direct contact" is to be understood as meaning "wetting". It will be appreciated that the liquid absorption medium selected from the group consisting of $A_{VE}$, $A_{VE1}$, $A_{VE2}$ and the metal, preferably aluminium, comprised in the contact surface are thus in direct contact. In case the metal comprised in the contact surface is aluminium, it is not particularly restricted and is in particular selected from the group consisting of elemental aluminium or aluminium compounds such as in particular passivated aluminium (where passivated aluminium is to be understood as meaning in particular aluminium oxide).

In the embodiment according to the invention in which an apparatus $V_1$ is employed and comprises the following components:
- (i) at least one water absorption unit $W_{abs1}$ set up for contacting the moist gas mixture with the liquid absorption medium $A_{VE}$,
- (ii) at least one water desorption unit $W_{des1}$ which comprises a heat exchanger $W_{x1}$ and is set up for at least partially removing water from a liquid absorption medium $A_{VE}$,
- (iii) and a circuit $U_1$ which connects the water absorption unit $W_{abs1}$ with the water desorption unit $W_{des1}$ and by means of which the liquid absorption medium $A_{VE}$ may be circulated, the contact surface at which the liquid absorption medium selected from the group consisting of $A_{VE}$, $A_{VE1}$, $A_{VE2}$ contacts the surface made of a metal, preferably an aluminium, material of construction $O_{AI}$, is disposed in particular in at least one of the components selected from the group water absorption unit $W_{abs1}$, water desorption unit $W_{des1}$, circuit $U_1$, preferably in at least one of the components selected from the group water absorption unit $W_{abs1}$, water desorption unit $W_{des1}$.

This is because it has now been found that, surprisingly, the mixtures of at least one additive selected from the group consisting of compounds of the structure (II) and at least one salt S according to the invention show particularly good wetting of metal and in particular aluminium materials of construction, thus ensure particularly good heat transfer and are thus particularly suitable as liquid absorption media in the apparatus $V_1$ having a surface made of a metal, particularly an aluminium, material of construction $O_{AI}$, in which one of the absorption media selected from the group consisting of $A_{VE}$, $A_{VE1}$, $A_{VE2}$ is in direct contact with the surface made of a metal, in particular an aluminium, material of construction $O_{AI}$.

In a further preferred embodiment the process according to the invention is carried out in continuous fashion. This is to be understood as meaning in particular that following step b) the steps a) and b) are performed at least one more time and that the liquid absorption medium $A_{VE}$ employed in the steps a) additionally performed in each case is at least partially the liquid absorption medium $A_{VE2}$ obtained from the step b) performed immediately beforehand, i.e. in particular the water content of the liquid absorption medium $A_{VE}$ employed in the step a) additionally performed in each case and of the liquid absorption medium $A_{VE2}$ from the immediately preceding step b) is identical.

It is more preferable when this embodiment comprises heating liquid absorption medium $A_{VE1}$ with heat from liquid absorption medium $A_{VE2}$. This may be carried out in an additional heat exchanger $W_{y1}$, in particular selected from the group consisting of shell and tube heat exchangers and plate and frame heat exchangers. This makes it possible to carry out the process according to the invention in a particularly energy efficient fashion.

The invention also relates in a further aspect to an absorption medium $A_{VE}$ as described herein as well as to its use in an absorption chiller.

The invention also relates in a further aspect to an apparatus $V_2$ for dehumidifying a moist gas mixture, in particular moist air, comprising the components
(i) a liquid absorption medium $A_{VO}$ comprising a mixture of at least one additive selected from the group consisting of compounds of the structure (II) with

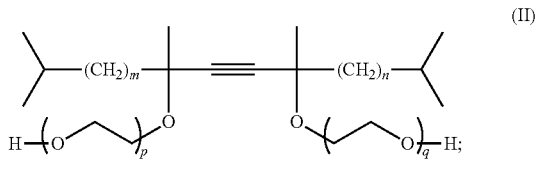

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$,
(ii) at least one water absorption unit $W_{abs2}$ set up for contacting the moist gas mixture with the liquid absorption medium $A_{VO}$,
(iii) at least one water desorption unit $W_{des2}$ which comprises a heat exchanger $W_{x2}$ and is set up for at least partially removing water from a liquid absorption medium $A_{VO}$,
(iv) and a circuit $U_2$ which connects the water absorption unit $W_{abs2}$ with the water desorption unit $W_{des2}$ and by means of which the liquid absorption medium $A_{VO}$ may be circulated,
wherein at least one of the components water absorption unit $W_{abs2}$, water desorption unit $W_{des2}$, circuit $U_2$ at least partially comprises a surface made of a metal material of construction $O_{AI}$, and
wherein disposed in the apparatus $V_2$ is at least one contact surface at which the liquid absorption medium $A_{VO}$ contacts the surface made of a metal material of construction $O_{AI}$, characterized in that
$Q^+$is a dialkylimidazolium cation in which, in particular, the alkyl groups each independently of one another have 1 to 10 carbon atoms,
wherein $A^-$ is an anion selected from the group consisting of $R^*COO^-$, $R'SO_3^{3-}$, $HSO_4^-$, $R''SO_4^-$,
wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms,
and wherein M+ is an alkali metal ion, preferably $Li^+$, $K^+$or $Na^+$, more preferably $K^+$or $Na^+$, and wherein m and n are independently of each other integral numbers in the range of 0 to 3, preferably 0 to 2,
and wherein p and q are independently of each other integral numbers in the range of 0 to 30, wherein the sum of p+q is an integral number in the range of 0 to 30, and more preferably p and q are independently of each other integral numbers in the range of 0 to 10, wherein the sum of p+q is an integral number in the range of 0 to 10,
and wherein the metal is selected from the group consisting of aluminium, steel, copper, noble metals, titanium, more preferably selected from the group consisting of aluminium, platinum, and wherein the metal most preferably is aluminium.

The apparatus according to the invention $V_2$ is suitable for dehumidifying a moist gas mixture, in particular moist air. Said apparatus comprises the following components:

As a first component the apparatus $V_2$ according to the invention comprises a liquid absorption medium $A_{VO}$ which comprises a mixture of at least one additive selected from the group consisting of compounds of the structure (II) where

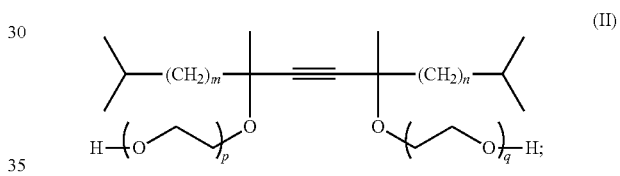

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$,
wherein $Q^+$ is a dialkylimidazolium cation, preferably a 1,3-dialkylimidazolium cation, in which even more preferably the alkyl groups each independently of one another have 1 to 10 carbon atoms,
wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms,
wherein $R^1$, $R^2$, $R^3$ are each independently of one another an alkyl group, in particular having 1 to 10 carbon atoms,
and wherein $M^+$ is an alkali metal ion, preferably $Li^+$, $K^+$or $Na^+$, yet more preferably $K^+$or $Na^+$,
and wherein m and n are independently of each other integral numbers in the range of 0 to 3,
and wherein p and q are independently of each other integral numbers in the range of 0 to 30, wherein the sum of p+q is an integral number in the range of 0 to 30.

In a preferred embodiment of the apparatus $V_2$ according to the invention in the absorption medium $A_{VO}$ the salt S is selected from the group consisting of $Q^+A^-$, $Q^+(R^1O)_2PO_2^-$, and preferably is $Q^+(R^1O)_2PO_2^-$, and $Q^+$is a dialkylimidazolium cation in which the alkyl groups each independently of one another have 1 to 6, preferably 1 or 4, more preferably 1 or 2 carbon atoms, and $A^-$ is an anion selected from the group consisting of $R^*COO^-$, $R'SO_3^-$, $R''SO_4^-$, wherein $R^*$, $R^1$, $R'$, $R''$, are each independently of one another an alkyl group having 1 to 6, preferably 1 to 4, more preferably 1 or 2, carbon atoms.

In a more preferred embodiment of the apparatus $V_2$ according to the invention in the absorption medium $A_{VO}$ the salt S has the general formula $Q^+(R^1O)_2PO_2^-$, and $Q^+$ is a dialkylimidazolium cation in which the alkyl groups are each independently of one another selected from the group consisting of methyl, ethyl, butyl, even more preferably selected from the group consisting of methyl or ethyl, and $R^1$, is methyl or ethyl.

In a yet more preferred embodiment of the apparatus $V_2$ according to the invention in the absorption medium $A_{VO}$ the salt S has the general formula $Q^+(R^1O)_2PO_2^-$, and $Q^+$ is selected from the group consisting of 1,3-dimethylimidazolium, 1,3-diethylimidazolium, 1-ethyl-3-methylimidazolium; $R^1$ is methyl or ethyl. Most preferably, the salt S is 1-ethyl-3-methylimidazolium diethylphosphate.

It has now been found that, surprisingly, the mixtures of the above mentioned salts S display a lower surface tension and have a particularly small contact angle with aluminium and thus ensure particularly good surface wetting when at least one additive selected from the group consisting of compounds of the structure (II) is added. This results in a relatively large contact area, thus also in fewer nonwetted spaces and thus in improved heat transfer inside the apparatus $V_2$.

The compounds of the structure (II) of the liquid absorption medium $A_{VO}$ can be described as acetylenic glycol compounds which optionally are ethoxylated. They are known to the skilled person and can be synthesized from the ethylene oxide and the acetylenic tertiary glycols by promoting of basic catalysts, for example described in U.S. Pat. No. 3,268,593. In structure (II), m and n are independently of each other integral numbers in the range of 0 to 3, preferably 0 to 2, and p and q are independently of each other integral numbers in the range of 0 to 30, wherein the sum of p+q is an integral number in the range of 0 to 30. More preferably, p and q are independently of each other integral numbers in the range of 0 to 10, wherein the sum of p+q is an integral number in the range of 0 to 10, Most preferred are compounds of structure (II) in which m=n=2 and p and q are independently of each other integral numbers in the range of 0 to 4, wherein the sum of p+q is an integral number in the range of 0 to 4.

As stated above, it has been found that the addition of one of the compounds selected from the group consisting of the compounds of structure (II) to the salt S provides advantageous properties.

The liquid absorption medium $A_{VO}$ is preferably an aqueous solution in which, in particular, the total weight of all compounds of the structure (II) and all salts S is in the range from 20.1 wt.-% to 92 wt.-% based on the total weight of the aqueous solution. It is yet more preferable when the total weight of all compounds of structure (II) and all salts S in $A_{VO}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

The ratio of all compounds of the structure (II) to the salts S in the absorption medium $A_{VO}$ is not further restricted. However, it is preferable that in the absorption medium $A_{VO}$ the ratio of the total weight of all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

In a more preferred embodiment according to the present invention, the absorption medium $A_{VO}$ comprises at least one salt S as described above, at least one compound of structure (II) and at least one compound of structure (I) with

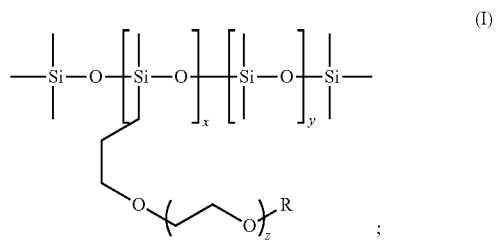

(I)

wherein R is hydrogen or methyl,
and wherein x is an integral number in the range of 1 to 5,
wherein y is an integral number in the range of 0 to 5,
and wherein z is an integral number in the range of 1 to 15, preferably 1 to 8, and wherein preferably the sum of x+y is an integral number in the range of 1 to 6.

In the cases where x>1, the value of z in the x units in structure (I) can be the same or different.

In a preferable embodiment, in structure (I), x is an integral number in the range of 1 to 5, and y is an integral number in the range of 0 to 5, and z is an integral number in the range of 1 to 8, and the sum of x+y is an integral number in the range of 1 to 6.

When the absorption medium $A_{VO}$ comprises at least one compound of structure (I) and at least one compound of structure (II), it is further preferred that the ratio of the total weight of all compounds of structure (I) to the total weight of all compounds of structure (II) is in the range of 3:1 to 1:3 and preferably is 1:1.

The liquid absorption medium $A_{VO}$ may be employed in the apparatus $V_2$ according to the invention in the form of the pure mixture of the salts S with the compounds of the structure (II) and optionally compounds of the structure (I). More preferably in the apparatus $V_2$ according to the invention the liquid absorption medium $A_{VO}$ is an aqueous solution in which, in particular, the total weight of all compounds of structure (I) and all compounds of the structure (II) and all salts S is in the range from 20.1 wt.-% to 92 wt.-% based on the total weight of the aqueous solution. It is yet more preferable when the total weight of all compounds of structure (I) and all compounds of structure (II) and all salts S in $A_{VO}$ is in the range 20.5 wt.-% to 90.5 wt.-% based on the total weight of the aqueous solution, yet more preferably in the range 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the apparatus $V_2$ according to the invention the ratio of all compounds of structure (II) and optionally all compounds of the structure (I) to the salts S in the absorption medium $A_{VO}$ is not further restricted. However, it is preferable to employ in the apparatus $V_2$ according to the invention an absorption medium $A_{VO}$ in which the ratio of the total weight of all compounds of structure (I) and all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

As a second component the apparatus $V_2$ according to the invention comprises a water absorption unit $W_{abs2}$ set up for contacting the moist gas mixture with the liquid absorption medium $A_{VO}$. The water absorption unit $W_{abs2}$ may in particular comprise an additional heat exchanger $W_{z2}$ set up such that the liquid absorption medium $A_{VO}$ is coolable. Employable as such a water absorption unit $W_{abs2}$ are in particular the water absorbers known to those skilled in the art. Said absorbers are based on the principle of increasing the surface area of the liquid absorption medium $A_{VO}$ and simultaneously achieving the longest possible residence time of the liquid absorption medium $A_{VO}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films.

As a third component the apparatus $V_2$ according to the invention comprises a water desorption unit $W_{des2}$ which comprises a heat exchanger $W_{x2}$ and is set up for at least partially removing water from the liquid absorption medium $A_{VO}$. Employable therefor are in particular the combinations of heat exchanger and water desorber known to those skilled in the art. The water desorption unit $W_{des2}$ is based on the principle of supplying heat to the liquid absorption medium $A_{VO}$, increasing the surface area of the liquid absorption medium $A_{VO}$ and simultaneously achieving the longest possible residence time of the liquid absorption medium $A_{VO}$ in the water desorption unit.

Employable as water desorption unit $W_{des2}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des2}$ comprising a heat exchanger $W_{x2}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des2}$ falling-films, in particular shell and tube falling-films.

As a fourth component the apparatus $V_2$ according to the invention comprises a circuit $U_2$ which connects the water absorption unit $W_{abs2}$ with the water desorption unit $W_{des2}$ and by means of which the liquid absorption medium $A_{VO}$ may be circulated. The circuit $U_2$ is preferably a conduit, more preferably selected from the group consisting of tube, hose. In a further preferred embodiment the circuit $U_2$ also comprises a pump.

An essential feature of the apparatus $V_2$ according to the invention is that said apparatus at least partially comprises a surface made of a metal material of construction $O_{AI}$ (in the context of the invention $O_{AI}$ is an abbreviation for "surface made of a metal material of construction").

Accordingly, the metal of the material of construction $O_{AI}$ is selected from the group consisting of aluminium, steel, copper, noble metals, titanium, more preferably selected from the group consisting of aluminium, platinum, and most preferably is aluminium.

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular highest purity aluminium having a purity of >99.0 wt.-%, more preferably >99.9 wt.-%.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may then in particular be in the form of a wrought alloy or of a cast alloy.

A "steel material of construction" in the context of the present invention is to be understood as meaning in particular any iron alloy where the mass fraction of iron is greater than the mass fraction of every other element present. The proportion of iron in the steel material of construction is preferably >50 wt.-%, more preferably 60 wt.-%, yet more preferably 70 wt.-%, yet more preferably >80 wt.-%, yet more preferably >99 wt.-%. In accordance with the invention in addition to iron the steel material of construction comprises in particular at least one alloying metal selected from the group consisting of nickel, chromium, vanadium, molybdenum, niobium, tungsten, cobalt, magnesium, manganese, silicon, zinc, lead, copper, titanium, more preferably selected from the group consisting of nickel, chromium, vanadium, molybdenum, niobium, tungsten, cobalt, magnesium, manganese, titanium, particularly chromium, wherein this yet more preferably has a mass fraction in the steel material of construction greater than 10.5 wt.-% but smaller than 50 wt.-%. It is yet more preferable when at the same time the carbon content in the steel material of construction is then always <2.06 wt.-%, yet more preferably 1.2 wt.-%. It will be appreciated that the sum of the contents of iron, alloying metal (for example chromium) and carbon in the steel material of construction must not exceed 100 wt.-%. The steel material of construction may in particular be in the form of a wrought alloy or of a cast alloy.

An platinum material of construction in the context of the present invention is to be understood as meaning both unalloyed platinum and platinum alloys where in particular the mass fraction of platinum is greater than the mass fraction of every other element. The platinum material of construction is preferably unalloyed platinum.

Unalloyed platinum is in particular platinum having a purity of >80 wt.-%, more preferably >85 wt.-%, yet more preferably >90 wt.-%, yet still more preferably >95 wt.-%, yet still more preferably >98 wt.-%. It is in particular highest purity platinum having a purity of >99.0 wt.-%, more preferably >99.5 wt.-%, more preferably >99.9 wt.-%.

Platinum alloys comprise in addition to the platinum in particular at least one alloying metal selected from the group consisting of magnesium, manganese, silicon, zinc, lead, copper, titanium, iron, more preferably selected from the group consisting of magnesium, manganese, silicon, zinc, lead, copper, titanium.

The description for platinum applies mutatis mutandis for other noble metals such as silver, gold, and also for other metals such as copper, titanium.

A further essential feature of the apparatus $V_2$ according to the invention is that disposed in said apparatus is a contact surface at which the liquid absorption medium $A_{VO}$ contacts the surface made of a metal, preferably an aluminium, material of construction $O_{AI}$. This is to be understood as meaning that at this contact surface the liquid absorption medium $A_{VO}$ is in direct contact with the surface made of a metal, preferably an aluminium, material of construction $O_{AI}$. In the context of the present invention "in direct contact" is to be understood as meaning "wetting". It will be appreciated that the liquid absorption medium $A_{VO}$ and the metal, preferably the aluminium comprised in the contact surface are thus in direct contact. In case the metal comprised in the contact surface is aluminium, it is not particularly restricted and is in particular selected from the group consisting of elemental aluminium or aluminium compounds such as in particular passivated aluminium (where passivated aluminium is to be understood as meaning in particular aluminium oxide).

In a preferred embodiment the apparatus $V_2$ comprises a further heat exchanger $W_{y2}$ (additional to the heat exchanger $W_{x2}$ comprised in the water desorption unit $W_{des2}$). The heat exchanger $W_{y2}$ is set up such that liquid absorption medium $A_{VO}$ sent from the water absorption unit $W_{abs2}$ to the water desorption unit $W_{des2}$ is suppliable with heat from liquid absorption medium $A_{VO}$, said medium being conducted away from the water desorption unit $W_{des2}$. This can be ensured by employing as heat exchanger $W_{y2}$ in particular a heat exchanger selected from shell and tube heat exchangers, plate and frame heat exchangers.

In a further preferred embodiment the apparatus $V_2$ is part of an absorption chiller. This absorption chiller then comprises as further components a condenser, an evaporator and a coolant, wherein the coolant is water.

The condenser is in particular connected to the water desorption unit $W_{des2}$ via a conduit and is set up for condensing water at least partially removed from the liquid absorption medium $A_{VO}$ in the water desorption unit $W_{des2}$. The condenser preferably also comprises a cooling water circuit.

The evaporator is in particular connected to the condenser via a conduit (which may comprise a throttling means) and connected to the water absorption unit $W_{abs2}$ via a further conduit and is set up for evaporating condensed water from the condenser. The evaporator preferably also comprises a pressure of <1 bar, more preferably <0.1 bar, to permit evaporation of the condensed water at the lowest possible temperatures. The evaporator may further preferably additionally comprise an apparatus from which heat may be drawn and so that the condensed water may be evaporated (for example a coolant conduit in which coolant is passed into the space in which water is evaporated).

2.2 Compounds According to Structure (I)

The present invention accordingly relates in a second aspect to a process for dehumidifying a moist gas mixture G, in particular moist air, in an apparatus $V_1$, comprising the steps of:
(a) contacting the moist gas mixture G with a liquid absorption medium $A_{VE}$ comprising a mixture of at least one additive selected from the group consisting of compounds of the structure (I) with

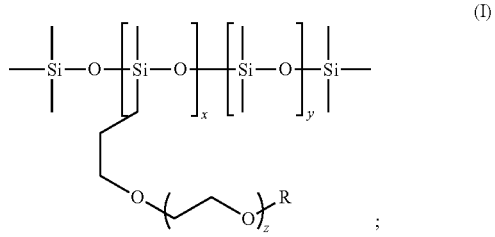

(I)

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein the liquid absorption medium $A_{VE}$ at least partially absorbs water from the moist gas mixture G, to obtain a liquid absorption medium $A_{VE1}$ having an elevated water content compared to the liquid absorption medium $A_{VE}$ and a gas mixture $G_1$ having a relatively low water content compared to the moist gas mixture G, (b) at least partially removing water from the liquid absorption medium $A_{VE1}$ to obtain a liquid absorption medium $A_{VE2}$ having a relatively low water content compared to the liquid absorption medium $A_{VE1}$, wherein the apparatus $V_1$ at least partially comprises a surface made of a metal material of construction $O_{AI}$ and in the apparatus $V_1$ at least one of the liquid absorption media selected from the group consisting of $A_{VE}$, $A_{VE1}$, $A_{VE2}$ contacts the surface made of a metal material of construction $O_{AI}$ via at least one contact surface, characterized in that $Q^+$ is a dialkylimidazolium cation in which, in particular, the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, wherein R is hydrogen or methyl, and wherein $M^+$ is an alkali metal ion, preferably $Li^+$, $K^+$ or $Na^+$, more preferably $K^+$ or $Na^+$, and wherein x is an integral number in the range of 1 to 5, wherein y is an integral number in the range of 0 to 5, and wherein z is an integral number in the range of 1 to 15, preferably 1 to 8, and wherein preferably the sum of x+y is an integral number in the range of 1 to 6, and wherein the metal is selected from the group consisting of aluminium, steel, copper, noble metals, titanium, more preferably selected from the group consisting of aluminium, platinum, and wherein the metal most preferably is aluminium.

The gas mixture G is not particularly restricted. "Moist" is to be understood as meaning in the context of the invention "comprising water, in particular water vapour". "Dehumidifying" is to be understood as meaning at least partially removing water.

"At least partially" is to be understood as meaning in the context of the invention "partially or completely".

"Moist gas mixture G" is accordingly to be understood as meaning in the context of the invention that the gas mixture G comprises water, preferably water vapour ("water vapour" is to be understood as meaning water in the gaseous physical state), and that its composition is otherwise not particularly restricted. The water content of this moist gas mixture is not particularly restricted and is in particular from 0.01 vol.-% to 99.99 vol.-% ("vol.-%" indicates the volume of water vapour based on the overall volume of moist gas mixture G). The composition of the moist gas G may otherwise vary depending on the application of the process according to the invention. The moist gas mixture G is in particular selected from moist natural gas, moist air (this may be moist indoor air or the moist air resulting from evaporation of water in absorption chillers), preferably moist air. For moist natural gas the water content is in particular from 0.01 vol.-% to 15.00 vol.-%, for moist air said content is in particular from 0.01 vol.-% to 15.00 vol.-% in the case of moist indoor air or in particular from 95.00 vol.-% to 99.99 vol.-% which is the preferred range when moist air resulting from evaporation of water in absorption chillers is concerned.

A "dialkyl imidazolium" cation according to the invention is preferably a 1,3-dialkylimidazolium cation.

"Integral number in the range of 1 to 5" is to be understood as meaning in the context of the invention all integral numbers 1, 2, 3, 4, and 5, i.e. including the two limits 1 and 5.

"Integral number in the range of 1 to 6" is to be understood as meaning in the context of the invention all integral numbers 1, 2, 3, 4, 5, and 6, i.e. including the two limits 1 and 6.

"Integral number in the range of 1 to 8" is to be understood as meaning in the context of the invention all integral numbers 1, 2, 3, 4, 5, 6, 7, and 8, i.e. including the two limits 1 and 8.

"Integral number in the range of 0 to 2" is to be understood as meaning in the context of the invention all integral numbers 0, 1, and 2, i.e. including the two limits 0 and 2.

"Integral number in the range of 0 to 3" is to be understood as meaning in the context of the invention all integral numbers 0, 1, 2, and 3, i.e. including the two limits 0 and 3.

"Integral number in the range of 0 to 30" is to be understood as meaning in the context of the invention all integral numbers 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, i.e. including the two limits 0 and 30.

"Integral number in the range of 0 to 10" is to be understood as meaning in the context of the invention all integral numbers 0, 1, 2, 3, 4, 5, 6, 7, 8, 9, and 10, i.e. including the two limits 0 and 10.

"Integral number in the range of 0 to 5" is to be understood as meaning in the context of the invention all integral numbers 0, 1, 2, 3, 4, and 5, i.e. including the two limits 0 and 5.

"Integral number in the range of 1 to 15" is to be understood as meaning in the context of the invention all integral numbers 1, 2, 3, 4, 5, 6, 7, 8, 9, 10, 11, 12, 13, 14, and 15, i.e. including the two limits 1 and 15.

The condition "wherein x is an integral number in the range of 1 to 5, wherein y is an integral number in the range of 0 to 5, and wherein the sum of x+y is an integral number in the range of 1 to 6" means that for each of x and y both conditions have to be fulfilled, i.e. x has to be an integral number between 1 and 5, and y has to be an integral number between 0 and 5, and the choice of x and y has to be so that their sum is in the range of 1 to 6.

The process according to the invention is carried out in an apparatus $V_1$ which at least partially comprises a surface made of a metal material of construction $O_{AI}$ (in the context of the invention $O_{AI}$ is short for "surface made of a metal material of construction") and in which at least one of the liquid absorption media selected from the group consisting of $A_{VE}$, $A_{VE1}$, $A_{VE2}$ contacts the surface made of a metal material of construction $O_{AI}$ via at least one contact surface.

It was surprisingly found that the absorption media according to the present invention display lower surface tension in comparison to the pure ionic liquid. In addition, it was surprisingly observed that the contact angle between the absorption medium according to the present invention and aluminium is lower than for the pure ionic liquid, thus favouring good heat transfer.

Accordingly, the metal of the material of construction $O_{AI}$ is selected from the group consisting of aluminium, steel, copper, noble metals, titanium, more preferably selected from the group consisting of aluminium, platinum, and most preferably is aluminium.

Preferred steel material according to the invention is stainless steel.

Preferred noble metals according to the invention are selected from the group consisting of platinum, gold, silver. The most preferred nobel metal is platinum.

It is in particular possible to employ an apparatus $V_1$ having the following components:
(i) at least one water absorption unit $W_{abs1}$ set up for contacting the moist gas mixture with the liquid absorption medium $A_{VE}$,
(ii) at least one water desorption unit $W_{des1}$ which comprises a heat exchanger $W_{x1}$ and is set up for at least partially removing water from a liquid absorption medium $A_{VE}$,
(iii) and a circuit $U_1$ which connects the water absorption unit $W_{abs1}$ with the water desorption unit $W_{des1}$ and by means of which the liquid absorption medium $A_{VE}$ may be circulated.

The water absorption unit $W_{abs1}$ is the component in which step a) of the process according to the invention in particular is carried out. Employable as water absorption unit $W_{abs1}$ are in particular the water absorbers known to those skilled in the art. Said absorbers are based on the principle of increasing the surface area of the liquid absorption medium $A_{VE}$ and simultaneously achieving the longest possible residence time of the liquid absorption medium $A_{VE}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films. The water absorption unit $W_{abs1}$ may in particular also comprise an additional heat exchanger $W_{z1}$ set up such that the liquid absorption medium $A_{VE}$ is coolable.

The water desorption unit $W_{des1}$ which comprises a heat exchanger $W_{x1}$ is the unit in which step b) of the process according to the invention in particular is carried out. The water desorption unit $W_{des1}$ is based on the principle of supplying heat to the water-laden liquid absorption medium $A_{VE}$ (in particular $A_{VE1}$), increasing the surface area of the water-laden liquid absorption medium $A_{VE}$ (in particular $A_{VE1}$) and simultaneously achieving the longest possible residence time of the water-laden liquid absorption medium $A_{VE}$ (in particular $A_{VE1}$) in the water desorption unit.

Employable as water desorption unit $W_{des1}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des1}$ comprising a heat exchanger $W_{x1}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des1}$ falling-films, in particular shell and tube falling-films.

Circuit $U_1$ in particular passes $A_{VE1}$ from step a) of the process according to the invention from the water absorption unit $W_{abs1}$ to the water desorption unit $W_{des1}$ and more preferably—in particular when the process according to the invention is carried out in continuous fashion—additionally passes $A_{VE2}$ from step b) of the process according to the invention from the water absorption unit $W_{des1}$ to the water desorption unit $W_{abs1}$.

The circuit $U_1$ is in particular a conduit, in particular selected from the group consisting of tube, hose.

In a further preferred embodiment the circuit $U_1$ also comprises a pump.

A first step of the process according to the invention comprises contacting the moist gas mixture G with a liquid absorption medium $A_{VE}$ comprising a mixture of at least one additive selected from the group consisting of compounds of the structure (I) with

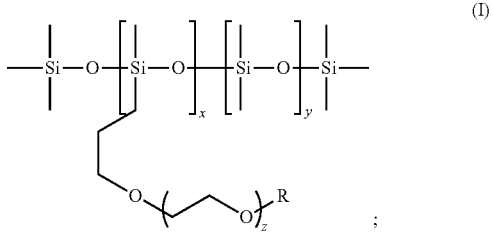
(I)

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$. The contacting may be effected in any way known to those skilled in the art, in particular in a water absorption unit $W_{abs1}$. The contacting causes the absorption medium $A_{VE}$ to at least partially absorb moisture, i.e. water, from the moist gas stream G to afford a liquid absorption medium $A_{VE1}$ having an elevated water content compared to the liquid absorption medium $A_{VE}$ and a gas mixture $G_1$ having a relatively low water content compared to the moist gas mixture G.

It is preferable to cool the absorption medium $A_{VE}$ during contacting of the moist gas mixture G in order that as much moisture as possible is absorbed from the moist gas mixture G. This may be achieved, for example, via an additional heat exchanger $W_{z1}$ in the water absorption unit $W_{abs1}$. The temperature of the absorption medium $A_{VE}$ during contacting of the moist gas mixture G is thus preferably in the range of from 2° C. to 100° C., preferably from 3° C. to 80° C., more preferably from 4° C. to 50° C., most preferably from 5° C. to 30° C.

The absorption medium $A_{VE}$ comprises a mixture of at least one additive selected from the group consisting of compounds of the structure (I) with

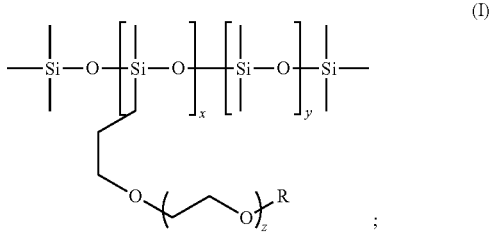
(I)

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, wherein $Q^+$ is a dialkylimidazolium cation in which in particular the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, wherein R is hydrogen or methyl, and wherein $M^+$ is an alkali metal ion, preferably $Li^+$, $K^+$ or $Na^+$, yet more preferably $K^+$ or $Na^+$, and wherein x is an integral number in the range of 1 to 5, wherein y is an integral number in the range of 0 to 5, and wherein z is an integral number in the range of 1 to 15.

In the cases where x>1, the value of z in the x units in structure (I) can be the same or different.

In a preferred embodiment of the process according to the invention the salt S is selected from the group consisting of $Q^+A^-$, $Q^+(R^1O)_2PO_2^-$, preferably the salt S is $Q^+(R^1O)_2PO_2^-$, and $Q^+$ is a dialkylimidazolium cation in which the alkyl groups each independently of one another have 1 to 6, preferably 1 or 4, more preferably 1 or 2 carbon atoms, and $A^-$ is an anion selected from the group consisting of $R^*COO^-$, $R'SO_3^-$, $R''SO_4^-$, wherein $R^*$, $R^1$, $R'$, $R''$, are each independently of one another an alkyl group having 1 to 6, preferably 1 to 4, more preferably 1 or 2, carbon atoms.

In a more preferred embodiment of the process according to the invention, the salt S has the general formula $Q^+(R^1O)_2PO_2^-$, and $Q^+$ is a dialkylimidazolium cation in which the alkyl groups are each independently of one another selected from the group consisting of methyl, ethyl, butyl, even more preferably selected from the group consisting of methyl or ethyl, and $R^1$ is methyl or ethyl.

In a yet more preferred embodiment of the process according to the invention, the salt S has the general formula $Q^+(R^1O)_2PO_2^-$, and $Q^+$ is selected from the group consisting of 1,3-dimethylimidazolium, 1,3-diethylimidazolium, 1-ethyl-3-methylimidazolium; $R^1$ is methyl or ethyl. Most preferably, the salt S is 1-ethyl-3-methylimidazolium diethylphosphate.

It has now been found that, surprisingly, the mixtures of the above mentioned salts S display a lower surface tension and have a particularly small contact angle with aluminium and thus ensure particularly good surface wetting when at least one additive selected from the group consisting of compounds of the structure (I) is added. This results in a relatively large contact area, thus also in fewer nonwetted spaces and thus in improved heat transfer inside the apparatus $V_1$ and thus also in a particularly efficient process.

The compounds of the structure (I) of the liquid absorption medium $A_{VE}$ can be described as siloxane compounds. Such compounds are known to the skilled person and can be synthesized from a catalytic hydrosilylation process, which describes the addition of Si—H bonds to unsaturated bonds. Such process is e.g. described on pages 466/467 of N. N. Greenwood, A. Earnshaw, Chemie der Elemente, corrected print of the 1$^{st}$ edition, VCH, 1990, Weinheim, Basel, Cambridge, N.Y. (translated into German by Hückmann).

In structure (I), x is an integral number in the range of 1 to 5, and y is an integral number in the range of 0 to 5, and z is an integral number in the range of 1 to 15.

In a preferable embodiment, in structure (I), x is an integral number in the range of 1 to 5, and y is an integral number in the range of 0 to 5, and z is an integral number in the range of 1 to 8, and the sum of x+y is an integral number in the range of 1 to 6.

As stated above, it has been found that the addition of one of the compounds selected from the group consisting of the compounds of structure (I) to the salt S provides advantageous properties.

In the process according to the invention, the liquid absorption medium $A_{VE}$ is preferably an aqueous solution in which, in particular, the total weight of all compounds of the structure (I) and all salts S is in the range from 20.1 wt.-% to 92 wt.-% based on the total weight of the aqueous solution. It is yet more preferable when the total weight of all compounds of structure (I) and all salts S in $A_{VE}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the process according to the invention the ratio of all compounds of the structure (I) to the salts S in the absorption medium $A_{VE}$ is not further restricted. However, it is preferable to employ in the process according to the invention an absorption medium $A_{VE}$ in which the ratio of the total weight of all compounds of the structure (I) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

In a more preferred embodiment according to the present invention, the absorption medium $A_{VE}$ comprises at least one salt S as described above, at least one compound of structure (I) and at least one compound of structure (II) with

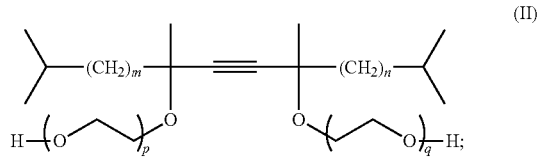

wherein, in structure (II), m and n are independently of each other integral numbers in the range of 0 to 3, preferably 0 to 2, and p and q are independently of each other integral numbers in the range of 0 to 30, wherein the sum of p+q is an integral number in the range of 0 to 30. More preferably, p and q are independently of each other integral numbers in the range of 0 to 10, wherein the sum of p+q is an integral number in the range of 0 to 10. Most preferred are compounds of structure (II) in which m=n=2 and p and q are independently of each other integral numbers in the range of 0 to 4, wherein the sum of p+q is an integral number in the range of 0 to 4.

The compounds of the structure (II) of the liquid absorption medium $A_{VE}$ can be described as acetylenic glycol compounds which optionally are ethoxylated. They are known to the skilled person and can be synthesized from the ethylene oxide and the acetylenic tertiary glycols by promoting of basic catalysts, for example described in U.S. Pat. No. 3,268,593.

When the absorption medium $A_{VE}$ comprises at least one compound of structure (I) and at least one compound of structure (II), it is further preferred that the ratio of the total weight of all compounds of structure (I) to the total weight of all compounds of structure (II) is in the range of 3:1 to 1:3, and preferably is 1:1.

The liquid absorption medium $A_{VE}$ may, in the process according to the invention, be employed in the form of the pure mixture of the salts S with the compounds of the structure (I) and optionally compounds of the structure (II). More preferably in the process according to the invention, the liquid absorption medium $A_{VE}$ is an aqueous solution in which, in particular, the total weight of all compounds of structure (I) and all compounds of the structure (II) and all salts S is in the range from 20.1 wt.-% to 92 wt.-% based on the total weight of the aqueous solution. It is yet more preferable when the total weight of all compounds of structure (I), all compounds of structure (II) and all salts S in $A_{VE}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the process according to the invention the ratio of all compounds of structure (I) and optionally all compounds of the structure (II) to the salts S in the absorption medium $A_{VE}$ is not further restricted.

However, it is preferable to employ in the process according to the invention an absorption medium $A_{VE}$ in which the ratio of the total weight of all compounds of structure (I) and all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

The gas mixture $G_1$ obtained in the first step of the process according to the invention and having a relatively low water content compared to the moist gas mixture G then represents the dehumidified gas stream which, depending on the application, can be returned to living or working spaces in the form of dehumidified air or in the case of natural gas can be supplied to power generation.

The absorption medium $A_{VE1}$ obtained in the first step of the process according to the invention has an elevated water content compared to the liquid absorption medium $A_{VE}$. It will be appreciated that $A_{VE1}$, in terms of the compounds of structure (I) and optionally (II) comprised in it and of the salts S comprised in it, is identical to $A_{VE}$ and is preferably distinguished therefrom only by the water content.

A second step of the process according to the invention comprises at least partially removing water from the liquid absorption medium $A_{VE1}$ to obtain a liquid absorption medium $A_{VE2}$ having a relatively low water content compared to the liquid absorption medium $A_{VE1}$. This additionally comprises supplying heat in particular to the liquid absorption medium $A_{VE1}$. The supply of heat and the at least partial removal may be effected in any way known to those skilled in the art, in particular in a water desorption unit $W_{des1}$ comprising a heat exchanger $W_{x1}$. The at least partial removal of water from the liquid absorption medium $A_{VE1}$ affords a liquid absorption medium $A_{VE2}$ having a relatively low water content compared to the liquid absorption medium $A_{VE1}$.

It will be appreciated that the liquid absorption medium $A_{VE2}$, in terms of the compounds of structure (I) and optionally (II) comprised in it and of the salts S comprised in it, is identical to $A_{VE1}$ and is preferably distinguished therefrom only by the water content.

An essential feature of the process according to the invention is that the apparatus $V_1$ at least partially comprises a surface made of a metal material of construction $O_{AI}$ (in the context of the invention $O_{AI}$ is an abbreviation for "surface made of a metal material of construction").

Accordingly, the metal of the material of construction $O_{AI}$ is selected from the group consisting of aluminium, steel, copper, noble metals, titanium, more preferably selected from the group consisting of aluminium, platinum, and most preferably is aluminium.

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular aluminium having a purity of >80 wt.-%, more preferably >85 wt.-%, yet more preferably >90 wt.-%, yet still more preferably >95 wt.-%, yet still more preferably >98 wt.-%. It is in particular highest purity aluminium having a purity of >99.0 wt.-%, more preferably >99.5 wt.-%, more preferably >99.9 wt.-%.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may then in particular be in the form of a wrought alloy or of a cast alloy.

A "steel material of construction" in the context of the present invention is to be understood as meaning in particular any iron alloy where the mass fraction of iron is greater than the mass fraction of every other element present. The proportion of iron in the steel material of construction is preferably >50 wt.-%, more preferably 60 wt.-%, yet more preferably 70 wt.-%, yet more preferably >80 wt.-%, yet more preferably >99 wt.-%. In accordance with the invention in addition to iron the steel material of construction comprises in particular at least one alloying metal selected from the group consisting of nickel, chromium, vanadium, molybdenum, niobium, tungsten, cobalt, magnesium, manganese, silicon, zinc, lead, copper, titanium, more preferably selected from the group consisting of nickel, chromium, vanadium, molybdenum, niobium, tungsten, cobalt, magnesium, manganese, titanium, particularly chromium, wherein this yet more preferably has a mass fraction in the steel material of construction 20 greater than 10.5 wt.-% but smaller than 50 wt.-%. It is yet more preferable when at the same time the carbon content in the steel material of construction is then always <2.06 wt.-%, yet more preferably 1.2 wt.-%. It will be appreciated that the sum of the contents of iron, alloying metal (for example chromium) and carbon in the steel material of construction must not exceed 100 wt.-%. 25 The steel material of construction may in particular be in the form of a wrought alloy or of a cast alloy.

An platinum material of construction in the context of the present invention is to be understood as meaning both unalloyed platinum and platinum alloys where in particular the mass fraction of platinum is greater than the mass fraction of every other element. The platinum material of construction is preferably unalloyed platinum.

Unalloyed platinum is in particular platinum having a purity of >80 wt.-%, more preferably >85 wt.-%, yet more preferably >90 wt.-%, yet still more preferably >95 wt.-%, yet still more preferably >98 wt.-%. It is in particular highest purity platinum having a purity of >99.0 wt.-%, more preferably >99.5 wt.-%, more preferably >99.9 wt.-%.

Platinum alloys comprise in addition to the platinum in particular at least one alloying metal selected from the group consisting of magnesium, manganese, silicon, zinc, lead, copper, titanium, iron, more preferably selected from the group consisting of magnesium, manganese, silicon, zinc, lead, copper, titanium.

The description for platinum applies mutatis mutandis for other noble metals such as silver, gold, and also for other metals such as copper, titanium.

A further essential feature of the process according to the invention is that in the apparatus $V_1$ at least one of the liquid absorption media selected from the group consisting of $A_{VE}$, $A_{VE1}$, $A_{VE2}$ contacts the surface made of a metal, preferably, aluminium, material of construction $O_{AI}$ via at least one contact surface. This is to be understood as meaning that at this contact surface the liquid absorption medium $A_{VE}$ in question, $A_{VE1}$ or $A_{VE2}$, is in direct contact with the surface made of a metal, preferably aluminium, material of construction $O_{AI}$. In the context of the present invention "in direct contact" is to be understood as meaning "wetting". It will be appreciated that the liquid absorption medium selected from the group consisting of $A_{VE}$, $A_{VE1}$, $A_{VE2}$ and the metal, preferably aluminium, comprised in the contact surface are thus in direct contact. In case the metal comprised in the contact surface is aluminium, it is not particularly restricted and is in particular selected from the group consisting of elemental aluminium or aluminium compounds such as in particular passivated aluminium (where passivated aluminium is to be understood as meaning in particular aluminium oxide).

In the embodiment according to the invention in which an apparatus $V_1$ is employed and comprises the following components:

(i) at least one water absorption unit $W_{abs1}$ set up for contacting the moist gas mixture with the liquid absorption medium $A_{VE}$, (ii) at least one water desorption unit $W_{des1}$ which comprises a heat exchanger $W_{x1}$ and is set up for at least partially removing water from a liquid absorption medium $A_{VE}$, (iii) and a circuit $U_1$ which connects the water absorption unit $W_{abs1}$ with the water desorption unit $W_{des1}$ and by means of which the liquid absorption medium $A_{VE}$ may be circulated, the contact surface at which the liquid absorption medium selected from the group consisting of $A_{VE}$, $A_{VE1}$, $A_{VE2}$ contacts the surface made of a metal, preferably an aluminium, material of construction $O_{AI}$, is disposed in particular in at least one of the components selected from the group water absorption unit $W_{abs1}$, water desorption unit $W_{des1}$, circuit $U_1$, preferably in at least one of the components selected from the group water absorption unit $W_{des1}$, water desorption unit $W_{des1}$.

This is because it has now been found that, surprisingly, the mixtures of at least one additive selected from the group consisting of compounds of the structure (I) and at least one salt S according to the invention show particularly good wetting of metal and in particular aluminium materials of construction, thus ensure particularly good heat transfer and are thus particularly suitable as liquid absorption media in the apparatus $V_1$ having a surface made of a metal, particularly an aluminium, material of construction $O_{AI}$, in which one of the absorption media selected from the group consisting of $A_{VE}$, $A_{VE1}$, $A_{VE2}$ is in direct contact with the surface made of a metal, in particular an aluminium, material of construction $O_{AI}$.

In a further preferred embodiment the process according to the invention is carried out in continuous fashion. This is to be understood as meaning in particular that following step b) the steps a) and b) are performed at least one more time and that the liquid absorption medium $A_{VE}$ employed in the steps a) additionally performed in each case is at least partially the liquid absorption medium $A_{VE2}$ obtained from the step b) performed immediately beforehand, i.e. in particular the water content of the liquid absorption medium $A_{VE}$ employed in the step a) additionally performed in each case and of the liquid absorption medium $A_{VE2}$ from the immediately preceding step b) is identical.

It is more preferable when this embodiment comprises heating liquid absorption medium $A_{VE1}$ with heat from liquid absorption medium $A_{VE2}$. This may be carried out in an additional heat exchanger $W_{y1}$, in particular selected from the group consisting of shell and tube heat exchangers and plate and frame heat exchangers. This makes it possible to carry out the process according to the invention in a particularly energy efficient fashion.

The invention also relates in a further aspect to an absorption medium $A_{VE}$ as described herein as well as to its use in an absorption chiller.

The invention also relates in a further aspect to an apparatus $V_2$ for dehumidifying a moist gas mixture, in particular moist air, comprising the components (i) a liquid absorption medium $A_{VO}$ comprising a mixture of at least one additive selected from the group consisting of compounds of the structure (I) with

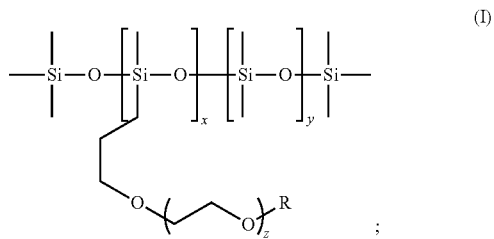

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, (ii) at least one water absorption unit $W_{abs2}$ set up for contacting the moist gas mixture with the liquid absorption medium $A_{VO}$, (iii) at least one water desorption unit $W_{des2}$ which comprises a heat exchanger $W_{x2}$ and is set up for at least partially removing water from a liquid absorption medium $A_{VO}$, (iv) and a circuit $U_2$ which connects the water absorption unit $W_{abs2}$ with the water desorption unit $W_{des2}$ and by means of which the liquid absorption medium $A_{VO}$ may be circulated, wherein at least one of the components water absorption unit $W_{abs2}$, water desorption unit $W_{des2}$, circuit $U_2$ at least partially comprises a surface made of a metal material of construction $O_{AI}$, and wherein disposed in the apparatus $V_2$ is at least one contact surface at which the liquid absorption medium $A_{VO}$ contacts the surface made of a metal material of construction $O_{AI}$, characterized in that $Q^+$ is a dialkylimidazolium cation in which, in particular, the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, wherein R is hydrogen or methyl, and wherein $M^+$ is an alkali metal ion, preferably $Li^+$, $K^+$ or $Na^+$, more preferably $K^+$ or $Na^+$, and wherein x is an integral number in the range of 1 to 5, wherein y is an integral number in the range of 0 to 5, and wherein z is an integral number in the range of 1 to 15, preferably 1 to 8, and wherein preferably the sum of x+y is an integral number in the range of 1 to 6, and wherein the metal is selected from the group consisting of aluminium, steel, copper, noble metals, titanium, more preferably selected from the group consisting of aluminium, platinum, and wherein the metal most preferably is aluminium.

The apparatus according to the invention $V_2$ is suitable for dehumidifying a moist gas mixture, in particular moist air. Said apparatus comprises the following components:

As a first component the apparatus $V_2$ according to the invention comprises a liquid absorption medium $A_{VO}$ which comprises a mixture of at least one additive selected from the group consisting of compounds of the structure (I) where

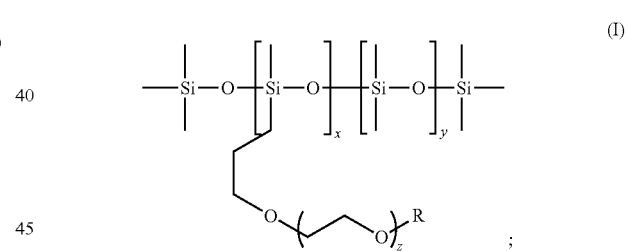

and at least one salt S selected from the group consisting of $Q^+A^-$, $Q^+(R^1O)_2PO_2^-$, $(Q^+)_2R^2PO_3^{2-}$, $Q^+M^+R^3OPO_3^{2-}$, wherein $Q^+$ is a dialkylimidazolium cation, preferably a 1,3-dialkylimidazolium cation, in which even more preferably the alkyl groups each independently of one another have 1 to 10 carbon atoms, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, in particular having 1 to 10 carbon atoms, wherein $R^1$, $R^2$, $R^3$ are each independently of one another an alkyl group, in particular having 1 to 10 carbon atoms, wherein R is hydrogen or methyl, and wherein $M^+$ is an alkali metal ion, preferably $Li^+$, $K^+$ or $Na^+$, yet more preferably $K^+$ or $Na^+$, and wherein x is an integral number in the range of 1 to 5, wherein y is an integral number in the range of 0 to 5, and wherein z is an integral number in the range of 1 to 15.

In the cases where x>1, the value of z in the x units in structure (I) can be the same or different.

In a preferred embodiment of the apparatus $V_2$ according to the invention in the absorption medium $A_{VO}$ the salt S is selected from the group consisting of $Q^+A^-$, $Q^+(R^1O)_2PO_2^-$, and preferably is $Q^+(R^1O)_2PO_2^-$, and $Q^+$ is a dialkylimidazolium cation in which the alkyl groups each independently of one another have 1 to 6, preferably 1 or 4, more preferably 1 or 2 carbon atoms, and $A^-$ is an anion selected from the group consisting of $R^*COO^-$, $R'SO_3^-$, $R''SO_4^-$, wherein $R^*$, $R^1$, $R'$, $R''$, are each independently of one another an alkyl group having 1 to 6, preferably 1 to 4, more preferably 1 or 2, carbon atoms.

In a more preferred embodiment of the apparatus $V_2$ according to the invention in the absorption medium $A_{VO}$ the salt S has the general formula $Q^+(R^1O)_2PO_2^-$, and $Q^+$ is a dialkylimidazolium cation in which the alkyl groups are each independently of one another selected from the group consisting of methyl, ethyl, butyl, even more preferably selected from the group consisting of methyl or ethyl, and $R^1$, is methyl or ethyl.

In a yet more preferred embodiment of the apparatus $V_2$ according to the invention in the absorption medium $A_{VO}$ the salt S has the general formula $Q^+(R^1O)_2PO_2^-$, and $Q^+$ is selected from the group consisting of 1,3-dimethylimidazolium, 1,3-diethylimidazolium, 1-ethyl-3-methylimidazolium; $R^1$ is methyl or ethyl. Most preferably, the salt S is 1-ethyl-3-methylimidazolium diethylphosphate.

It has now been found that, surprisingly, the mixtures of the above mentioned salts S display a lower surface tension and have a particularly small contact angle with aluminium and thus ensure particularly good surface wetting when at least one additive selected from the group consisting of compounds of the structure (I) is added. This results in a relatively large contact area, thus also in fewer nonwetted spaces and thus in improved heat transfer inside the apparatus $V_2$.

The compounds of the structure (I) of the liquid absorption medium $A_{VO}$ can be described as siloxane compounds. Such compounds are known to the skilled person and can be synthesized from a catalytic hydrosilylation process, which describes the addition of Si—H bonds to unsaturated bonds. Such process is e.g. described on pages 466/467 of N. N. Greenwood, A. Earnshaw, Chemie der Elemente, corrected print of the 1$^{st}$ edition, VCH, 1990, Weinheim, Basel, Cambridge, N.Y. (translated into German by Hückmann).

In structure (I), x is an integral number in the range of 1 to 5, and y is an integral number in the range of 0 to 5, and z is an integral number in the range of 1 to 15.

In a preferable embodiment, in structure (I), x is an integral number in the range of 1 to 5, and y is an integral number in the range of 0 to 5, and z is an integral number in the range of 1 to 8, and the sum of x+y is an integral number in the range of 1 to 6.

As stated above, it has been found that the addition of one of the compounds selected from the group consisting of the compounds of structure (I) to the salt S provides advantageous properties.

The liquid absorption medium $A_{VO}$ is preferably an aqueous solution in which, in particular, the total weight of all compounds of the structure (I) and all salts S is in the range from 20.1 wt.-% to 92 wt.-% based on the total weight of the aqueous solution. It is yet more preferable when the total weight of all compounds of structure (I) and all salts S in $A_{VO}$ is in the range from 20.5 wt.-% to 90.5 wt.-% based on the total weight of the aqueous solution, yet more preferably in the range from 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

The ratio of all compounds of the structure (I) to the salts S in the absorption medium $A_{VO}$ is not further restricted. However, it is preferable that in the absorption medium $A_{VO}$ the ratio of the total weight of all compounds of the structure (I) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

In a more preferred embodiment according to the present invention, the absorption medium $A_{VO}$ comprises at least one salt S as described above, at least one compound of structure (I) and at least one compound of structure (II) with

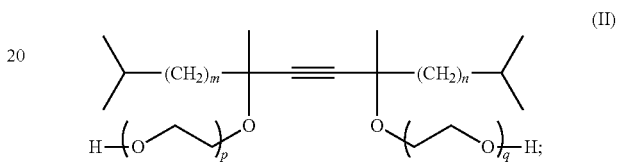

wherein, in structure (II), m and n are independently of each other integral numbers in the range of 0 to 3, preferably 0 to 2, and p and q are independently of each other integral numbers in the range of 0 to 30, wherein the sum of p+q is an integral number in the range of 0 to 30. More preferably, p and q are independently of each other integral numbers in the range of 0 to 10, wherein the sum of p+q is an integral number in the range of 0 to 10. Most preferred are compounds of structure (II) in which m=n=2 and p and q are independently of each other integral numbers in the range of 0 to 4, wherein the sum of p+q is an integral number in the range of 0 to 4.

The compounds of the structure (II) of the liquid absorption medium $A_{VE}$ can be described as acetylenic glycol compounds which optionally are ethoxylated. They are known to the skilled person and can be synthesized from the ethylene oxide and the acetylenic tertiary glycols by promoting of basic catalysts, for example described in U.S. Pat. No. 3,268,593.

When the absorption medium $A_{VO}$ comprises at least one compound of structure (I) and at least one compound of structure (II), it is further preferred that the ratio of the total weight of all compounds of structure (I) to the total weight of all compounds of structure (II) is in the range of 3:1 to 1:3 and preferably is 1:1.

The liquid absorption medium $A_{VO}$ may be employed in the apparatus $V_2$ according to the invention in the form of the pure mixture of the salts S with the compounds of the structure (I) and optionally compounds of the structure (II). More preferably in the apparatus $V_2$ according to the invention the liquid absorption medium $A_{VO}$ is an aqueous solution in which, in particular, the total weight of all compounds of structure (I) and all compounds of the structure (II) and all salts S is in the range from 20.1 wt.-% to 92 wt.-% based on the total weight of the aqueous solution. It is yet more preferable when the total weight of all compounds of structure (I) and all compounds of structure (II) and all salts S in $A_{VO}$ is in the range 20.5 wt.-% to 90.5 wt.-% based on the total weight of the aqueous solution, yet more preferably in the range 40.5 wt.-% to 80.5 wt.-%, yet more preferably 60.5 wt.-% to 76 wt.-% % based on the total weight of the aqueous solution, yet more preferably 75.5 to 75.75 wt.-% based on the total weight of the aqueous solution.

In the apparatus $V_2$ according to the invention the ratio of all compounds of structure (I) and optionally all compounds of the structure (II) to the salts S in the absorption medium $A_{VO}$ is not further restricted. However, it is preferable to employ in the apparatus $V_2$ according to the invention an absorption medium $A_{VO}$ in which the ratio of the total weight of all compounds of structure (I) and all compounds of the structure (II) to the total weight of all salts S is in the range 1:1000 to 1:10, more preferably 1:500 to 1:19, more preferably 1:180 to 1:39, yet more preferably 1:159 to 1:75, more preferably 1:150 to 1:79, even more preferably 1:119 to 1:100.

As a second component the apparatus $V_2$ according to the invention comprises a water absorption unit $W_{abs2}$ set up for contacting the moist gas mixture with the liquid absorption medium $A_{VO}$. The water absorption unit $W_{abs2}$ may in particular comprise an additional heat exchanger $W_{z2}$ set up such that the liquid absorption medium $A_{VO}$ is coolable. Employable as such a water absorption unit $W_{abs2}$ are in particular the water absorbers known to those skilled in the art. Said absorbers are based on the principle of increasing the surface area of the liquid absorption medium $A_{VO}$ and simultaneously achieving the longest possible residence time of the liquid absorption medium $A_{VO}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films.

As a third component the apparatus $V_2$ according to the invention comprises a water desorption unit $W_{des2}$ which comprises a heat exchanger $W_{x2}$ and is set up for at least partially removing water from the liquid absorption medium $A_{VO}$. Employable therefor are in particular the combinations of heat exchanger and water desorber known to those skilled in the art. The water desorption unit $W_{des2}$ is based on the principle of supplying heat to the liquid absorption medium $A_{VO}$, increasing the surface area of the liquid absorption medium $A_{VO}$ and simultaneously achieving the longest possible residence time of the liquid absorption medium $A_{VO}$ in the water desorption unit.

Employable as water desorption unit $W_{des2}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des2}$ comprising a heat exchanger $W_{x2}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des2}$ falling-films, in particular shell and tube falling-films.

As a fourth component the apparatus $V_2$ according to the invention comprises a circuit $U_2$ which connects the water absorption unit $W_{abs2}$ with the water desorption unit $W_{des2}$ and by means of which the liquid absorption medium $A_{VO}$ may be circulated. The circuit $U_2$ is preferably a conduit, more preferably selected from the group consisting of tube, hose. In a further preferred embodiment the circuit $U_2$ also comprises a pump.

An essential feature of the apparatus $V_2$ according to the invention is that said apparatus at least partially comprises a surface made of a metal material of construction $O_{AI}$ (in the context of the invention $O_{AI}$ is an abbreviation for "surface made of a metal material of construction").

Accordingly, the metal of the material of construction $O_{AI}$ is selected from the group consisting of aluminium, steel, copper, noble metals, titanium, more preferably selected from the group consisting of aluminium, platinum, and most preferably is aluminium.

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular highest purity aluminium having a purity of >99.0 wt.-%, more preferably >99.9 wt.-%.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may then in particular be in the form of a wrought alloy or of a cast alloy.

A "steel material of construction" in the context of the present invention is to be understood as meaning in particular any iron alloy where the mass fraction of iron is greater than the mass fraction of every other element present. The proportion of iron in the steel material of construction is preferably >50 wt.-%, more preferably 60 wt.-%, yet more preferably 70 wt.-%, yet more preferably >80 wt.-%, yet more preferably >99 wt.-%. In accordance with the invention in addition to iron the steel material of construction comprises in particular at least one alloying metal selected from the group consisting of nickel, chromium, vanadium, molybdenum, niobium, tungsten, cobalt, magnesium, manganese, silicon, zinc, lead, copper, titanium, more preferably selected from the group consisting of nickel, chromium, vanadium, molybdenum, niobium, tungsten, cobalt, magnesium, manganese, titanium, particularly chromium, wherein this yet more preferably has a mass fraction in the steel material of construction greater than 10.5 wt.-% but smaller than 50 wt.-%. It is yet more preferable when at the same time the carbon content in the steel material of construction is then always <2.06 wt.-%, yet more preferably 1.2 wt.-%. It will be appreciated that the sum of the contents of iron, alloying metal (for example chromium) and carbon in the steel material of construction must not exceed 100 wt.-%. The steel material of construction may in particular be in the form of a wrought alloy or of a cast alloy.

An platinum material of construction in the context of the present invention is to be understood as meaning both unalloyed platinum and platinum alloys where in particular the mass fraction of platinum is greater than the mass fraction of every other element. The platinum material of construction is preferably unalloyed platinum.

Unalloyed platinum is in particular platinum having a purity of >80 wt.-%, more preferably >85 wt.-%, yet more preferably >90 wt.-%, yet still more preferably >95 wt.-%, yet still more preferably >98 wt.-%. It is in particular highest purity platinum having a purity of >99.0 wt.-%, more preferably >99.5 wt.-%, more preferably >99.9 wt.-%.

Platinum alloys comprise in addition to the platinum in particular at least one alloying metal selected from the group consisting of magnesium, manganese, silicon, zinc, lead, copper, titanium, iron, more preferably selected from the group consisting of magnesium, manganese, silicon, zinc, lead, copper, titanium.

The description for platinum applies mutatis mutandis for other noble metals such as silver, gold, and also for other metals such as copper, titanium.

A further essential feature of the apparatus $V_2$ according to the invention is that disposed in said apparatus is a contact surface at which the liquid absorption medium $A_{VO}$ contacts the surface made of a metal, preferably an aluminium, material of construction $O_{AI}$. This is to be understood as meaning that at this contact surface the liquid absorption medium $A_{VO}$ is in direct contact with the surface made of a metal, preferably an aluminium, material of construction $O_{AI}$. In the context of the present invention "in direct contact" is to be understood as meaning "wetting". It will be appreciated that the liquid absorption medium $A_{VO}$ and the metal, preferably the aluminium comprised in the contact surface are thus in direct contact. In case the metal comprised in the contact surface is aluminium, it is not particularly restricted and is in particular selected from the group consisting of elemental aluminium or aluminium compounds such as in particular passivated aluminium (where passivated aluminium is to be understood as meaning in particular aluminium oxide).

In a preferred embodiment the apparatus $V_2$ comprises a further heat exchanger $W_{y2}$ (additional to the heat exchanger $W_{x2}$ comprised in the water desorption unit $W_{des2}$). The heat exchanger $W_{y2}$ is set up such that liquid absorption medium $A_{VO}$ sent from the water absorption unit $W_{abs2}$ to the water desorption unit $W_{des2}$ is suppliable with heat from liquid absorption medium $A_{VO}$, said medium being conducted away from the water desorption unit $W_{des2}$. This can be ensured by employing as heat exchanger $W_{y2}$ in particular a heat exchanger selected from shell and tube heat exchangers, plate and frame heat exchangers.

In a further preferred embodiment the apparatus $V_2$ is part of an absorption chiller. This absorption chiller then comprises as further components a condenser, an evaporator and a coolant, wherein the coolant is water.

The condenser is in particular connected to the water desorption unit $W_{des2}$ via a conduit and is set up for condensing water at least partially removed from the liquid absorption medium $A_{VO}$ in the water desorption unit $W_{des2}$. The condenser preferably also comprises a cooling water circuit.

The evaporator is in particular connected to the condenser via a conduit (which may comprise a throttling means) and connected to the water absorption unit $W_{abs2}$ via a further conduit and is set up for evaporating condensed water from the condenser. The evaporator preferably also comprises a pressure of <1 bar, more preferably <0.1 bar, to permit evaporation of the condensed water at the lowest possible temperatures. The evaporator may further preferably additionally comprise an apparatus from which heat may be drawn and so that the condensed water may be evaporated (for example a coolant conduit in which coolant is passed into the space in which water is evaporated).

DESCRIPTION OF THE FIGURES

The FIGS. 1 and 2 elucidated hereinbelow show preferred embodiments of the process according to the invention and the apparatus according to the invention. When reference to the process is made, the respective device is marked by the index "1" (such as "$W_{abs1}$"). When reference to the apparatus is made, the respective device is marked by the index "2" (such as "$W_{abs2}$").

FIG. 1 (abbreviated to "FIG. 1") shows an embodiment of the apparatus $V_2/V_1$ according to the invention.

The apparatus $V_2$ shown in FIG. 1 comprises a water absorption unit $W_{abs2}$ <103> (with optional additional heat exchanger $W_{z2}$ <104>) to which a conduit <101> leads and from which a conduit <102> leads away, a water desorption unit $W_{des2}$ <109> which comprises a heat exchanger $W_{x2}$ <108> and to which conduit <111> leads and from which conduits <110>, <112> and <113> lead away, and a circuit $U_2$ <115> formed from conduits <106>, <111> and <113> or <106>, <111>, <112> and <105> (in each case optionally with conduit <114>). The apparatus in FIG. 1 may also optionally comprise a further heat exchanger $W_{y2}$ <107> to which conduits <106> and <112> lead and from which conduits <105> and <111> lead away. In addition the apparatus also comprises a liquid absorption medium $A_{VO}$. Said medium is disposed in one or more of the abovementioned components water absorption unit $W_{abs2}$, water desorption unit $W_{des2}$, circuit $U_2$. Water absorption unit $W_{abs2}$ <103> may optionally also comprise an additional heat exchanger $W_{z2}$ <104>. Apparatus $V_2$, in particular at least one of the components selected from the group consisting of water absorption unit $W_{abs2}$, water desorption unit $W_{des2}$, circuit $U_2$, at least partially comprises a surface made of a metal, preferably an aluminium, material of construction $O_{AI}$ and there is at least one contact surface at which the liquid absorption medium $A_{VO}$ contacts the surface made of a metal, preferably an aluminium, material of construction $O_{AI}$. Optionally circuit $U_2$ may also additionally comprise a pump for conveying the liquid absorption medium.

Figure 2:
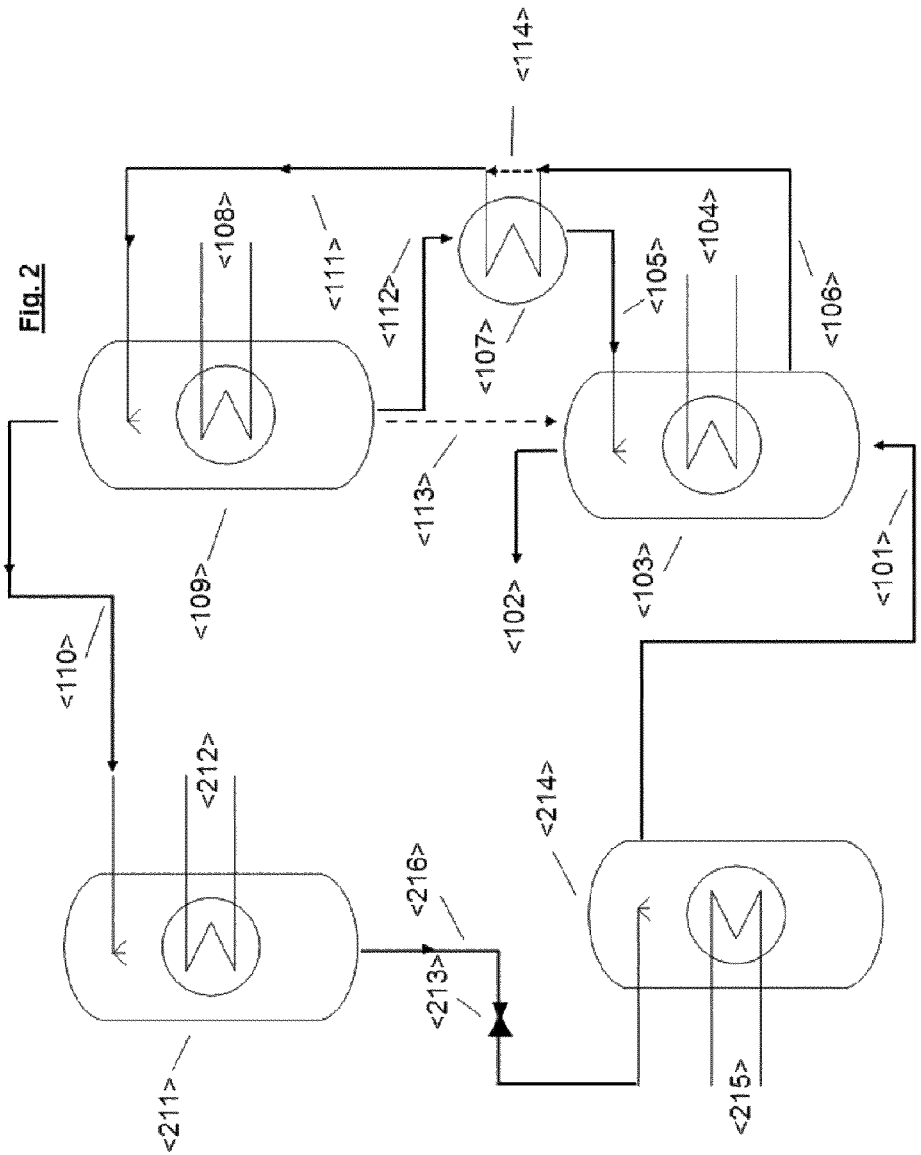
FIG. 2 shows in schematic fashion an absorption chiller into which an apparatus V2 is integrated.

Apparatus $V_1$ corresponds to apparatus $V_2$ without absorption medium $A_{VO}$, wherein in the figure description for FIG. 1 and FIG. 2 the terms $U_2$, $W_{abs2}$, $W_{des2}$, $W_{x2}$, $W_{y2}$, $W_{z2}$ are to be replaced by $U_1$, $W_{abs1}$, $W_{des1}$, $W_{x1}$, $W_{y1}$, and $W_{z1}$ respectively.

The process according to the invention will now be illustratively described with reference to apparatus $V_1$ using FIG. 1:

A stream of moist gas mixture G (said stream may be moist air, moist natural gas or moist gas mixture originating from the evaporator of an absorption chiller—see also FIG. 2 with regard to this option) is supplied via conduit <101> to a water absorption unit $W_{abs1}$ <103> and contacted there with the liquid absorption medium $A_{VE}$ supplied to the water absorption unit $W_{abs1}$ <103> via the conduit <105> or via the conduit <113>. The water absorption unit $W_{abs1}$ <103> may be any of the water absorbers cited hereinabove for $W_{abs1}$ <103>, in particular a falling-film. Contacting, in the water absorption unit $W_{abs1}$ <103>, gas mixture G supplied via conduit <101> with the liquid absorption medium $A_{VE}$ supplied via the conduit <105> or via the conduit <113> affords a liquid absorption medium $A_{VE1}$ having an elevated water content compared to the liquid absorption medium $A_{VE}$ and a stream of a gas mixture $G_1$ discharged via the conduit <102>, $G_1$ having a relatively low water content compared to the moist gas mixture G. Depending on the application $G_1$ is in particular dehumidified air or dehumidified natural gas. The water absorption unit $W_{abs1}$ <103> may optionally also comprise an additional heat exchanger $W_{z1}$ <104>. Preferably via the conduits <106>, <111> and the heat exchanger $W_{y1}$ <107> (or, when heat exchanger $W_{y1}$ <107> is not employed, via conduits <106>, <111> and <114>) the liquid absorption medium $A_{VE1}$ is then passed to the water desorption unit $W_{des1}$ <109> comprising the heat exchanger $W_{x1}$ <108>. The water-laden liquid absorption medium $A_{VE1}$ may additionally be supplied with heat in the optional heat exchanger $W_{y1}$ <107>. The at least partial removal of water from liquid absorption medium $A_{VE1}$ is then carried out in the water desorption unit $W_{des1}$ <109> to afford a liquid absorption medium $A_{VE2}$ having a relatively low water content compared to the liquid absorption $A_{VE1}$. The water removed is then discharged from the water desorption unit $W_{des1}$ <109> as liquid or vapour, preferably as vapour, via conduit <110>. The liquid absorption medium $A_{VE2}$ is then discharged from the water desorption unit $W_{des1}$ <109 > and returned to the water absorption unit $W_{abs1}$ <103>.

This may either be carried out directly, i.e. via the conduit <113> which is shown in dashed form in FIG. 1. Alternatively and preferably the liquid absorption medium $A_{VE2}$ may also be supplied via the conduit <112> to the optional heat exchanger $W_{y1}$ <107> in which the liquid absorption medium $A_{VE1}$ supplied via conduit <106> to the optional heat exchanger $W_{y1}$ <107> is supplied with heat from the liquid absorption medium $A_{VE2}$ supplied via conduit <112> to the optional heat exchanger $W_{y1}$ <107>. Once the concentrated liquid absorption medium $A_{VE2}$ has been supplied to the water absorption unit $W_{abs1}$ via conduit <105> or <113> said medium is reused as $A_{VE}$ for at least partially dehumidifying the gas stream in a new cycle. It is essential to the invention that in this process the apparatus according to FIG. 1, preferably at least one of the components selected from the group consisting of water absorption unit $W_{abs1}$ <103 > (in FIG. 1 said unit comprises the heat exchanger <104>), water desorption unit $W_{des1}$ <109 > (in FIG. 1 said unit comprises the heat exchanger <108>), circuit $U_1$ <115> (composed in FIG. 1 of the conduits <106>, <111>, <113>, or <106>, <111>, <112>, <105>, and in each case optionally also conduit <114>) at least partially comprises a surface made of an aluminium material of construction $O_{AI}$ and that disposed in the apparatus is at least one contact surface at which at least one of the liquid absorption media $A_{VE}$, $A_{VE1}$, $A_{VE2}$ contacts the surface made of a metal, preferably an aluminium, material of construction $O_{AI}$.

FIG. 2 (abbreviated as "FIG. 2") shows in schematic fashion an absorption chiller into which an apparatus $V_2$ is integrated. The constituents <101> to <114> are shown as for the apparatus $V_2$ described in FIG. 1. Additionally, the absorption chiller in FIG. 2 also comprises a condenser <211> which is connected to the water desorption unit $W_{des2}$<109> via the conduit <110> and is set up for condensing water at least partially removed from the liquid absorption medium $A_{VO}$ in the water desorption unit $W_{des2}$. Condenser <211> preferably also comprises a heat exchanger <212> with which cooling water may be supplied.

The absorption chiller shown in FIG. 2 also comprises an evaporator <214> connected to the condenser <211> via a conduit <216> (which may optionally comprise a throttling means <213>) and connected via the conduit <101> with the water absorption unit $W_{abs2}$ <103>. The evaporator <214> is set up to evaporate condensed water from the condenser. Additionally, the evaporator <214> can further preferably also comprise a heat exchanger <215> which supplies a medium, heat being drawn off from the medium to thus evaporate the condensed water (for example a coolant conduit with, in particular, water as coolant, this coolant being passed into the evaporator <214>).

In an embodiment of the process according to the invention (described hereinbelow with reference to apparatus $V_1$ using FIG. 2) moist gas mixture G originating from evaporator <214> is passed via the conduit <101> to the water absorption unit $W_{abs1}$ <103>. The water removed in water desorption unit $W_{des1}$ is supplied via the conduit <110> to the condenser <211> in which said water is recondensed. A cooling water circuit as heat exchanger <212> installed in the condenser <211> is optionally likewise used therefor. The condensed water is then supplied via a conduit <216> to the evaporator <214> in which the evaporation of water is effected in particular at low pressures thus bringing about a cooling effect. This may optionally also be effected using a throttling means <213>. This achieves a cooling action in the evaporator <214> and, for example, coolant may be cooled via the heat exchanger <215>. The water vapour generated is then returned to the water absorption unit $W_{abs1}$ <103> via conduit <101>.

FURTHER ASPECTS OF THE INVENTION

1. Process for dehumidifying a moist gas mixture G, in particular moist air, in an apparatus $V_1$, comprising the steps of:
    (a) contacting the moist gas mixture G with a liquid absorption medium $A_{VE}$ comprising a mixture of at least one additive selected from the group consisting of compounds of the structure (I) and compounds of the structure (II) with

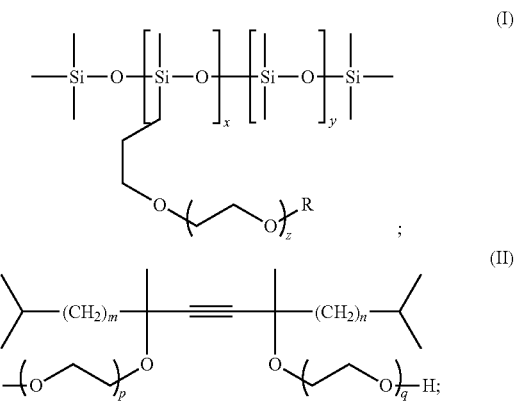

and at least one salt S selected from the group consisting of $Q^+A^-$, $Q^+(R^1O)_2PO_2^-$, $(Q^+)_2R^2OPO_3^{2-}$, $Q^+M^+R^{30}PO_3^{2-}$,
    wherein the liquid absorption medium $A_{VE}$ at least partially absorbs water from the moist gas mixture G,
    to obtain a liquid absorption medium $A_{VE1}$ having an elevated water content compared to the liquid absorption medium $A_{VE}$ and a gas mixture $G_1$ having a relatively low water content compared to the moist gas mixture G,
    (b) at least partially removing water from the liquid absorption medium $A_{VE1}$ to obtain a liquid absorption medium $A_{VE2}$ having a relatively low water content compared to the liquid absorption medium $A_{VE1}$,
    wherein the apparatus $V_1$ at least partially comprises a surface made of a metal material of construction $O_{AI}$ and in the apparatus $V_1$ at least one of the liquid absorption media selected from the group consisting of $A_{VE}$, $A_{VE1}$, $A_{VE2}$ contacts the surface made of a metal material of construction $O_{AI}$ via at least one contact surface, characterized in that $Q^+$ is a dialkylimidazolium cation, wherein $A^-$ is an anion selected from the group consisting of $R*COO^-$, $R'SO_3^-$, $HSO_4^-$, $R''SO_4^-$, wherein $R*$, $R'$, $R''$ are each independently of one another an alkyl group, wherein $R^1$, $R^2$, $R^3$ are each independently of one another an alkyl group, wherein R is hydrogen or methyl, and wherein $M^+$ is an alkali metal ion, and wherein x is an integral number in the range of 1 to 5, wherein y is an integral number in the range of 0 to 5, and wherein z is an integral number in the range of 1 to 15, and wherein m and n are independently of each other integral numbers in the range of 0 to 3, and wherein p and q are independently of each other integral numbers in the range of 0 to 30, wherein the sum of p+q is an integral number in the range of 0 to 30.

2. Process according to Point 1, wherein the metal is selected from aluminium, steel, copper, noble metals, titanium.

3. Process according to Point 1 or 2, wherein $Q^+$ is a dialkylimidazolium cation in which the alkyl groups each independently of one another have 1 to 10 carbon atoms, and wherein $R*$, $R'$, $R''$, $R^1$, $R^2$, $R^3$ are each independently of one another an alkyl group having 1 to 10 carbon atoms and wherein $M^+=Li^+$, $K^+$ or $Na^+$.

4. Process according to any of Points 1 to 3, wherein the salt S is $Q^+(R^1O)_2PO_2^-$, and $Q^+$ is a dialkylimidazolium cation in which the alkyl groups each independently of one another have 1 to 6 carbon atoms, wherein $R^1$ is an alkyl group having 1 to 6 carbon atoms.

5. Process according to any of Points 1 to 4, wherein the absorption medium $A_{VE}$ comprises at least one salt S, at least one compound of structure (I) and at least one compound of structure (II).

6. Process according to Point 5, wherein the ratio of the total weight of all compounds of structure (I) to the total weight of all compounds of structure (II) in the absorption medium $A_{VE}$ is in the range of 3:1 to 1:3.

7. Process according to any of Points 1 to 6, wherein the liquid absorption medium $A_{VE}$ is an aqueous solution.

8. Process according to Point 7, wherein in the liquid absorption medium $A_{VE}$ the total weight of all compounds of structure (I) and all compounds of the structure (II) and all salts S is in the range from 20.1 wt.-% to 92 wt.-% based on the total weight of the aqueous solution.

9. Process according to any of Points 1 to 8, wherein in the liquid absorption medium $A_{VE}$ the ratio of the total weight of all compounds of structure (I) and all compounds of the structure (II) to the total weight of all salts S is in the range 1:1000 to 1:10.

10. Apparatus $V_2$ for dehumidifying a moist gas mixture, comprising the components (i) a liquid absorption medium $A_{VO}$ comprising a mixture of at least one additive selected from the group consisting of compounds of the structure (I) and compounds of the structure (II) with

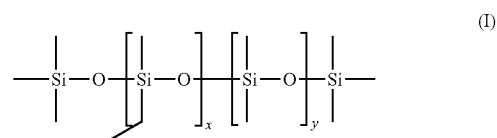

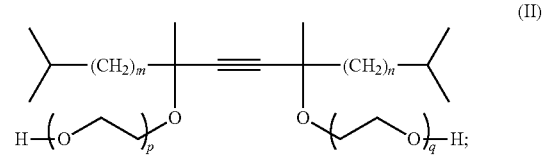

and at least one salt S selected from the group consisting of $Q^+A^-$, $Q^+(R^1O)_2PO_2^-$, $(Q^+)_2R^2OPO_3^{2-}$, $Q^+M^+R^{3O}PO_3^{2-}$, (ii) at least one water absorption unit $W_{abs2}$ <103> set up for contacting the moist gas mixture with the liquid absorption medium $A_{VO}$, (iii) at least one water desorption unit $W_{des2}$ <109> which comprises a heat exchanger $W_{x2}$ <108> and is set up for at least partially removing water from a liquid absorption medium $A_{VO}$, (iv) and a circuit $U_2$ <115> which connects the water absorption unit $W_{abs2}$ <103> with the water desorption unit $W_{des2}$ <109> and by means of which the liquid absorption medium $A_{VO}$ may be circulated, wherein at least one of the components water absorption unit $W_{abs2}$ <103>, water desorption unit $W_{des2}$ <109>, circuit $U_2$ <115> at least partially comprises a surface made of a metal material of construction $O_{AI}$, and wherein disposed in the apparatus $V_2$ is at least one contact surface at which the liquid absorption medium $A_{VO}$ contacts the surface made of a metal material of construction $O_{AI}$, characterized in that $Q^+$ is a dialkylimidazolium cation, wherein $A^-$ is an anion selected from the group consisting of $R*COO^-$, $R'SO_3^-$, $HSO_4^-$, $R''SO_4^-$, wherein $R*$, $R'$, $R''$, are each independently of one another an alkyl group, wherein $R^1$, $R^2$, $R^3$ are each independently of one another an alkyl group, wherein R is hydrogen or methyl, and wherein $M^+$ is an alkali metal ion, and wherein x is an integral number in the range of 1 to 5, wherein y is an integral number in the range of 0 to 5, and wherein z is an integral number in the range of 1 to 15, and wherein m and n are independently of each other integral numbers in the range of 0 to 3, and wherein p and q are independently of each other integral numbers in the range of 0 to 30, wherein the sum of p+q is an integral number in the range of 0 to 30.

11. Apparatus according to Point 10, wherein the metal is selected from aluminium, steel, copper, noble metals, titanium.

12. Apparatus $V_2$ according to Point 10 or 11, wherein $Q^+$ is a dialkylimidazolium cation in which the alkyl groups each independently of one another have 1 to 10 carbon atoms and wherein $R*$, $R'$, $R''$, $R^1$, $R^2$, $R^3$ are each independently of one another an alkyl group having 1 to 10 carbon atoms and wherein $M^+=Li^+$, $K^+$ or $Na^+$.

13. Apparatus $V_2$ according to any of Points 10 to 12, wherein the salt S is $Q^+(R^1O)_2PO_2^-$, and $Q^+$ is a dialkylimidazolium cation in which the alkyl groups each independently of one another have 1 to 6 carbon atoms, wherein $R^1$ is an alkyl group having 1 to 6 carbon atoms.

14. Apparatus $V_2$ according to any of Points 10 to 13, wherein the absorption medium $A_{VO}$ comprises at least one salt S, at least one compound of structure (I) and at least one compound of structure (II).

15. Apparatus $V_2$ according to Point 14, wherein the ratio of the total weight of all compounds of structure (I) to the total weight of all compounds of structure (II) in the absorption medium $A_{VO}$ is in the range of 3:1 to 1:3.

16. Apparatus $V_2$ according to any of Points 10 to 15, wherein the liquid absorption medium $A_{VO}$ is an aqueous solution.

17. Apparatus $V_2$ according to Point 16, wherein in the liquid absorption medium $A_{VO}$ the total weight of all compounds of structure (I) and all compounds of the structure (II) and all salts S is in the range from 20.1 wt.-% to 92 wt.-% based on the total weight of the aqueous solution.

18. Apparatus $V_2$ according to any of Points 10 to 17, wherein in the liquid absorption medium $A_{VO}$ the ratio of the total weight of all compounds of structure (I) and all compounds of the structure (II) to the total weight of all salts S is in the range 1:1000 to 1:10.

19. Absorption chiller, comprising an apparatus $V_2$ according to any of Points 10 to 18 and, as further components, a condenser <211>, an evaporator <214> and a coolant, wherein the coolant is water.

20. Absorption medium $A_{VE}$, comprising a mixture of at least one additive selected from the group consisting of compounds of the structure (I) and compounds of the structure (II) with

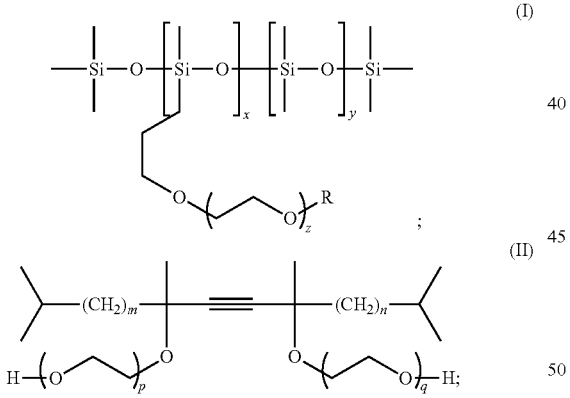

and at least one salt S selected from the group consisting of $Q^+A^-$, $Q^+(R^1O)_2PO_2^-$, $(Q^+)_2R^2OPO_3^{2-}$, $Q^+M^+R^3OPO_3^{2-}$, characterized in that $Q^+$ is a dialkylimidazolium cation, wherein $A^-$ is an anion selected from the group consisting of $R^*COO^-$, $R'SO_3^-$, $HSO_4^-$, $R''SO_4^-$, wherein $R^*$, $R'$, $R''$, are each independently of one another an alkyl group, wherein $R^1$, $R^2$, $R^3$ are each independently of one another an alkyl group, wherein R is hydrogen or methyl, and wherein $M^+$ is an alkali metal ion, and wherein x is an integral number in the range of 1 to 5, wherein y is an integral number in the range of 0 to 5, and wherein z is an integral number in the range of 1 to 15, and wherein m and n are independently of each other integral numbers in the range of 0 to 3, and wherein p and q are independently of each other integral numbers in the range of 0 to 30, wherein the sum of p+q is an integral number in the range of 0 to 30.

21. Absorption medium $A_{VE}$ according to Point 20, wherein $Q^+$ is a dialkylimidazolium cation in which the alkyl groups each independently of one another have 1 to 10 carbon atoms, and wherein $R^*$, $R'$, $R''$, $R^1$, $R^2$, $R^3$ are each independently of one another an alkyl group having 1 to 10 carbon atoms and wherein $M^+=Li^+$, $K^+$ or $Na^+$.

22. Absorption medium $A_{VE}$ according to Point 20 or 21, wherein the salt S is $Q^+(R^1O)_2PO_2^-$, and $Q^+$ is a dialkylimidazolium cation in which the alkyl groups each independently of one another have 1 to 6 carbon atoms, wherein $R^1$ is an alkyl group having 1 to 6 carbon atoms.

23. Absorption medium $A_{VE}$ according to any of Points 20 to 22, wherein the absorption medium $A_{VE}$ comprises at least one salt S, at least one compound of structure (I) and at least one compound of structure (II).

24. Absorption medium $A_{VE}$ according to Point 23, wherein the ratio of the total weight of all compounds of structure (I) to the total weight of all compounds of structure (II) is in the range of 3:1 to 1:3.

25. Absorption medium $A_{VE}$ according to any of Points 20 to 24, which is an aqueous solution.

26. Absorption medium $A_{VE}$ according to Point 25, wherein the total weight of all compounds of structure (I) and all compounds of the structure (II) and all salts S is in the range from 20.1 wt.-% to 92 wt.-% based on the total weight of the aqueous solution.

27. Absorption medium $A_{VE}$ according to any of Points 20 to 26, wherein the ratio of the total weight of all compounds of structure (I) and all compounds of the structure (II) to the total weight of all salts S is in the range 1:1000 to 1:10.

28. Use of the absorption medium $A_{VE}$ according to any of Points 20 to 27 in an absorption chiller.

The examples which follow are intended to elucidate the present invention without limiting said invention in any way.

EXAMPLES

1. Chemicals Employed

EMIM DEP (=1-ethyl-3-methylimidazolium diethylphosphate) was obtained from Evonik.

Formulation A was a mixture of siloxane compounds according to structure (I), wherein the values of x varied between 1 to 5, y varied between 0 to 5, and z varied between 1 and 15.

Formulation B was a mixture of glycol compounds according to structure (II), wherein the values of m and n were 2, respectively, and p+q=4. This mixture was obtained from Evonik and had a CAS number of 169117-72-0.

2. Comparative Example C1 and Inventive Examples I1 to I3: Test Procedure Surface Tension Static surface tension was measured by Wilhelmy plate method on a Kruss K12 equipment at 25° C. The force acting on a platinum plate which was immersed vertically in the liquid as set forth for Comparative Example C1 and Inventive Examples I1 to I3 as described hereinafter were measured. The surface tension was calculated by the force and the contact angle between the platinum plate and liquid.

The following liquids were tested in the different experiments:

Comparative Example C1: A mixture of 90 weight-% EMIM DEP and 10 weight-% water.

Inventive Example I1: A mixture of 90 weight-% EMIM DEP, 9.5 weight-% water, and 0.5 weight-% Formulation A.

Inventive Example I2: A mixture of 90 weight-% EMIM DEP, 9.5 weight-% water, and 0.5 weight-% Formulation B.

Inventive Example I3: A mixture of 90 weight-% EMIM DEP, 9.5 weight-% water, 0.25 weight-% Formulation A, and 0.25 weight-% Formulation B.

The results, i.e. the measured surface tension, are shown in the table 1.

TABLE 1

| Example | Liquid formulation | Surface tension (mN/m) |
| --- | --- | --- |
| C1 | EMIM DEP | 39.3 |
| I1 | EMIM DEP + formulation A | 39.1 |
| I2 | EMIM DEP + formulation B | 29.7 |
| I3 | EMIM DEP + formulation A + formulation B | 27.1 |

3. Comparative Examples C2 to C9 and Inventive Examples I4 to I11: Test Procedure for Contact Angle One drop (2 μL) of the respective solution as set forth hereinafter for each example was dropped onto an aluminium plate (highest purity aluminium; purity >99.0%) having dimensions of 3 cm×10 cm and a maximum thickness of 1 mm. The contact angle determination was carried out by OCA20 equipment from Eko.

The tested solutions were as follows:

In a first test series 1, the following solutions were measured:

Comparative Example C2: pure water;

Comparative Example C3: 20 weight-% EMIM DEP, 80 weight-% water.

Comparative Example C4: 40 weight-% EMIM DEP, 60 weight-% water.

Comparative Example C5: 60 weight-% EMIM DEP, 40 weight-% water.

Comparative Example C6: 80 weight-% EMIM DEP, 20 weight-% water.

Comparative Example C7: 90 weight-% EMIM DEP, 10 weight-% water.

In a second test series 2, the following solutions were measured:

Comparative Example C8: 99.5 weight-% water, 0.25 weight-% Formulation A, and 0.25 weight-% Formulation B.

Inventive Example I4: 79.5 weight-% water, 20 weight-% EMIM DEP, 0.25 weight-% Formulation A, and 0.25 weight-% Formulation B.

Inventive Example I5: 59.5 weight-% water, 40 weight-% EMIM DEP, 0.25 weight-% Formulation A, and 0.25 weight-% Formulation B.

Inventive Example I6: 39.5 weight-% water, 60 weight-% EMIM DEP, 0.25 weight-% Formulation A, and 0.25 weight-% Formulation B.

Inventive Example I7: 19.5 weight-% water, 80 weight-% EMIM DEP, 0.25 weight-% Formulation A, and 0.25 weight-% Formulation B.

Inventive Example I8: 9.5 weight-% water, 90 weight-% EMIM DEP, 0.25 weight-% Formulation A, and 0.25 weight-% Formulation B.

The results, i.e. the measured contact angle in each case, are shown in the table 2.

TABLE 2

| Test Series | Concentration of IL (wt.-%) | 0 | 20 | 40 | 60 | 80 | 90 |
| --- | --- | --- | --- | --- | --- | --- | --- |
| 1 | Example number/ | C2 | C3 | C4 | C5 | C6 | C7 |
|  | Measured contact angle | 97.9 | 89.4 | 81.9 | 74.2 | 64.5 | 62.6 |
| 2 | Example number/ | C8 | I4 | I5 | I6 | I7 | I8 |
|  | Measured contact angle | 6.1 | 23.4 | 26.2 | 48.7 | 59.8 | 60.6 |

In a third test series 3, the following solutions were measured:

Comparative Example C9: 75 weight-% EMIM DEP, 25 weight-% water.

Inventive Example I9: 75 weight-% EMIM DEP, 24.5 weight-% water, 0.25 weight-% Formulation A, and 0.25 weight-% Formulation B.

Inventive Example I10: 75 weight-% EMIM DEP, 24.25 weight-% water, 0.375 weight-% Formulation A, and 0.375 weight-% Formulation B.

Inventive Example I11: 75 weight-% EMIM DEP, 24.5 weight-% water, 0.5 weight-% Formulation A, and 0.5 weight-% Formulation B.

The results, i.e. the measured contact angle in each case, are shown in the table 3.

TABLE 3

| Test Series 3 | C9 | I9 | I10 | I11 |
| --- | --- | --- | --- | --- |
| Concentration of additive (= sum of formulation A and formulation B; wt.-%) based on the aqueous EMIM DEP solution | 0 | 0.5 | 0.75 | 1.00 |
| Contact angle on an aluminium plate (degree) | 65.8 | 51.2 | 50.8 | 46.8 |

The results show that the absorption media according to the invention exhibit a smaller surface tension (C1 viz. I1 to I3) and in addition a smaller contact angle to the aluminium-containing surface compared to those of the prior art (I4 to I11 as compared to C2 to C9) and thus ensure good heat conduction in the process according to the invention/for the apparatus according to the invention. The use of imidazolium salts in combination with the additives according to the present invention accordingly surprisingly achieves better wetting of the aluminium-containing surface and thus greater and more efficient heat exchange.

The invention claimed is:

1. A process for dehumidifying a moist gas mixture G, in an apparatus $V_1$, the process comprising:
   (a) contacting the moist gas mixture G with a first liquid absorption medium $A_{VE}$ comprising a mixture of at least one additive selected from the group consisting of compounds of the structure (II) with

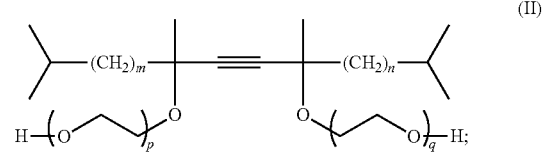

and at least one salt S selected from the group consisting of $Q^+A^-$, $Q^+(R^1O)_2PO_2^-$, $(Q^+)_2R^2OPO_3^{2-}$, and $Q^+M^+R^3OPO_3^{2-}$, wherein the first liquid absorption medium $A_{VE}$ at least partially absorbs water from the moist gas mixture G, to obtain a second liquid absorption medium $A_{VE1}$ having an elevated water content compared to the first liquid absorption medium $A_{VE}$ and a gas mixture $G_1$ having a lower water content compared to the moist gas mixture G, (b) at least partially removing water from the second liquid absorption medium $A_{VE1}$ to obtain a third liquid absorption medium $A_{VE2}$ having a lower water content compared to the second liquid absorption medium $A_{VE1}$, wherein the apparatus $V_1$ at least partially comprises a surface made of a metal material of construction $O_{AI}$ and in the apparatus $V_1$ at least one of the liquid absorption media selected from the group consisting of the first liquid absorption medium $A_{VE1}$, the second liquid absorption medium $A_{VE1}$, the third liquid absorption medium $A_{VE2}$ contacts the surface made of a metal material of construction $O_{AI}$ via at least one contact surface, wherein $Q^+$ is a dialkylimidazolium cation, wherein $A^-$ is an anion selected from the group consisting of $R^*COO^-$, $R'SO_3^-$, and $HSO_4^-$, $R''SO_4^-$, wherein $R^*$, $R'$, $R''$ are each independently of one another an alkyl group, wherein $R^1$, $R^2$, $R^3$ are each independently of one another an alkyl group, wherein $M^+$ is an alkali metal ion, wherein m and n are independently of each other integral numbers in the range of 0 to 3, wherein p and q are independently of each other integral numbers in the range of 0 to 30, wherein the sum of p+q is an integral number in the range of 0 to 30, and wherein the metal is selected from the group consisting of aluminium, steel, copper, noble metals, and titanium.

2. The process according to claim 1, wherein the first liquid absorption medium $A_{VE}$ is an aqueous solution.

3. The process according to claim 2, wherein in the first liquid absorption medium $A_{VE}$ a total weight of all compounds of the structure (II) and all salts S is in the range from 20.1 wt.-% to 92 wt.-% based on a total weight of the aqueous solution.

4. The process according to claim 1, wherein in the first liquid absorption medium $A_{VE}$ a ratio of a total weight of all compounds of the structure (II) to a total weight of all salts S is in the range 1:1000 to 1:10.

5. An apparatus $V_2$ for dehumidifying a moist gas mixture, comprising:

(i) a liquid absorption medium $A_{VO}$ comprising a mixture of at least one additive selected from the group consisting of compounds of the structure (II) with

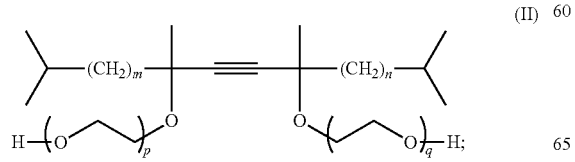
(II)

and at least one salt S selected from the group consisting of $Q^+A^-$, $Q^+(R^1O)_2PO_2^-$, $(Q^+)_2R^2OPO_3^{2-}$, and $Q^+M^+R^3OPO_3^{2-}$, (ii) at least one water absorption unit $W_{abs2}$ set up for contacting the moist gas mixture with the liquid absorption medium $A_{VO}$, (iii) at least one water desorption unit $W_{des2}$ comprising a heat exchanger $W_{x2}$ and being set up for at least partially removing water from a liquid absorption medium $A_{VO}$, and (iv) a circuit $U_2$ that connects the water absorption unit $W_{abs2}$ with the water desorption unit $W_{des2}$, wherein the circuit is used for circulation of the liquid absorption medium $A_{VO}$, wherein at least one of the components water absorption unit $W_{abs2}$, water desorption unit $W_{des2}$, circuit $U_2$ at least partially comprises a surface made of a metal material of construction $O_{AI}$, wherein disposed in the apparatus $V_2$ is at least one contact surface at which the liquid absorption medium $A_{VO}$ contacts the surface made of a metal material of construction $O_{AI}$, wherein $Q^+$ is a dialkylimidazolium cation, wherein $A^-$ is an anion selected from the group consisting of $R^*COO^-$, $R'SO_3^-$, and $HSO_4^-$, $R''SO_4^-$, wherein $R^*$, $R'$, $R''$, are each independently of one another an alkyl group, wherein $R^1$, $R^2$, $R^3$ are each independently of one another an alkyl group, wherein $M^+$ is an alkali metal ion, wherein m and n are independently of each other integral numbers in the range of 0 to 3, wherein p and q are independently of each other integral numbers in the range of 0 to 30, wherein the sum of p+q is an integral number in the range of 0 to 30, and wherein the metal is selected from group consisting of aluminium, steel, copper, noble metals, and titanium.

6. The apparatus $V_2$ according to claim 5, wherein the liquid absorption medium $A_{VO}$ is an aqueous solution.

7. The apparatus $V_2$ according to claim 6, wherein in the liquid absorption medium $A_{VO}$ a total weight of all compounds of the structure (II) and all salts S is in the range from 20.1 wt.-% to 92 wt.-% based on a total weight of the aqueous solution.

8. The apparatus $V_2$ according to claim 5, wherein in the liquid absorption medium $A_{VO}$ ratio of a total weight of all compounds of the structure (II) to a total weight of all salts S is in the range 1:1000 to 1:10.

9. An abosorption chiller, comprising:
the apparatus $V_2$ according to claim 5,
a condenser,
an evaporator, and
a coolant, wherein the coolant is water.

10. An absorption medium $A_{VE}$, comprising:
a mixture of at least one additive selected from the group consisting of compounds of the structure (II) with

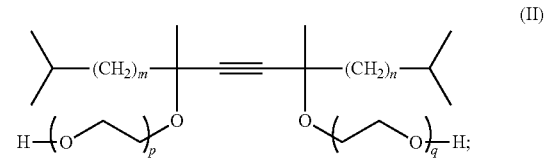
(II)

and at least one salt S selected from the group consisting of $Q^+A^-$, $Q^+(R^1O)_2PO_2^-$, $(Q^+)_2R^2OPO_3^{2-}$, and $Q^+M^+R^3OPO_3^{2-}$, wherein $Q^+$ is a dialkylimidazolium cation, wherein $A^-$ is an anion selected from the group consisting of $R^*COO^-$, $R'SO_3^-$, $HSO_4^-$, and $R''SO_4^-$, wherein $R^*$, $R'$, $R''$, are each independently of one another an alkyl group, wherein $R^1$, $R^2$, $R^3$ are each independently of one another an alkyl group, wherein $M^+$ is an alkali metal ion, wherein m and n are independently of each other integral numbers in the range of 0 to 3, and wherein p and q are independently of each other integral numbers in the range of 0 to 30, wherein the sum of p+q is an integral number in the range of 0 to 30.

11. The absorption medium $A_{VE}$ according to claim 10, wherein the absorption medium is an aqueous solution.

12. The absorption medium $A_{VE}$ according to claim 11, wherein a total weight of all compounds of the structure (II) and all salts S is in the range from 20.1 wt.-% to 92 wt.-% based on total weight of the aqueous solution.

13. The absorption medium $A_{VE}$ according to claim 10, wherein a ratio of a total weight of all compounds of the structure (II) to total weight of all salts S is in the range 1:1000 to 1:10.

14. The absorption medium $A_{VE}$ according to claim 13, wherein the absorption medium is in an absorption chiller.

15. A process for dehumidifying a moist gas mixture G, in an apparatus $V_1$, comprising:

(a) contacting the moist gas mixture G with a first liquid absorption medium $A_{VE}$ comprising a mixture of at least one additive selected from the group consisting of compounds of the structure (I) with

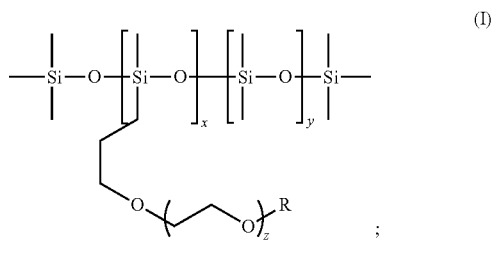
(I)

and at least one salt S selected from the group consisting of $Q^+A^-$, $Q^+(R^1O)_2PO_2^-$, $(Q^+)_2R^2OPO_3^{2-}$, and $Q^+M^+R^3OPO_3^{2-}$, wherein the first liquid absorption medium $A_{VE}$ at least partially absorbs water from the moist gas mixture G, to obtain a second liquid absorption medium $A_{VE1}$ having an elevated water content compared to the first liquid absorption medium $A_{VE}$ and a gas mixture $G_1$ having a lower water content compared to the moist gas mixture G, (b) at least partially removing water from the second liquid absorption medium $A_{VE1}$ to obtain a third liquid absorption medium $A_{VE2}$ having a lower water content compared to the second liquid absorption medium $A_{VE1}$, wherein the apparatus $V_1$ at least partially comprises a surface made of a metal material of construction $O_{AI}$ and in the apparatus $V_1$ at least one of the liquid absorption media selected from the group consisting of the first liquid absorption medium $A_{VE}$, the second liquid absorption medium $A_{VE1}$, the third liquid absorption medium $A_{VE2}$ contacts the surface made of a metal material of construction $O_{AI}$ via at least one contact surface, wherein $Q^+$ is a dialkylimidazolium cation, wherein $A^-$ is an anion selected from the group consisting of $R^*COO^-$, $R'SO_3^-$, $HSO_4^-$, an $R''SO_4^-$, wherein $R^*$, $R'$, $R''$ are each independently of one another an alkyl group, wherein $R^1$, $R^2$, $R^3$ are each independently of one another an alkyl group, wherein R is hydrogen or methyl, wherein $M^+$ is an alkali metal ion, wherein x is an integral number in the range of 1 to 5, wherein y is an integral number in the range of 0 to 5, wherein z is an integral number in the range of 1 to 15, and wherein the metal is selected from the group consisting of aluminium, steel, copper, noble metals, and titanium.

16. The process according to claim 15, wherein first the liquid absorption medium $A_{VE}$ is an aqueous solution.

17. The process according to claim 16, wherein in the first liquid absorption medium $A_{VE}$ a total weight of all compounds of structure (I) and all salts S is in the range from 20.1 wt.-% to 92 wt.-% based on total weight of the aqueous solution.

18. The process according to claim 15, wherein in the first liquid absorption medium $A_{VE}$ a ratio of a total weight of all compounds of structure (I) to a total weight of all salts S is in the range 1:1000 to 1:10.

19. An apparatus $V_2$ for dehumidifying a moist gas mixture, comprising:

(i) a liquid absorption medium $A_{VO}$ comprising a mixture of at least one additive selected from the group consisting of compounds of the structure (I) with

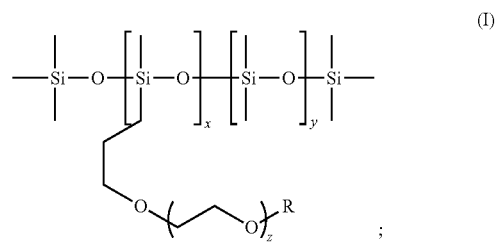
(I)

and at least one salt S selected from the group consisting of $Q^+A^-$, $Q^+(R^1O)_2PO_2^-$, $(Q^+)_2R^2OPO_3^{2-}$, and $Q^+M^+R^3OPO_3^{2-}$, (ii) at least one water absorption unit $W_{abs2}$ set up for contacting the moist gas mixture with the liquid absorption medium $A_{VO}$, (iii) at least one water desorption unit $W_{des2}$ which comprises a heat exchanger $W_{x2}$ and is set up for at least partially removing water from a liquid absorption medium $A_{VO}$, and (iv) a circuit $U_2$ that connects the water absorption unit $W_{abs2}$ with the water desorption unit $W_{des2}$, wherein the circuit is used to circulate the liquid absorption medium $A_{VO}$, wherein at least one of the components water absorption unit $W_{abs2}$, water desorption unit $W_{des2}$, circuit $U_2$ at least partially comprises a surface made of a metal material of construction $O_{AI}$, wherein disposed in the apparatus $V_2$ is at least one contact surface at which the liquid absorption medium $A_{VO}$ contacts the surface made of a metal material of construction $O_{AI}$, wherein $Q^+$ is a dialkylimidazolium cation, wherein $A^-$ is an anion selected from the group consisting of $R^*COO^-$, $R'SO_3^-$, $HSO_4^-$, and $R''SO_4^-$, wherein $R^*$, $R'$, $R''$, are each independently of one another an alkyl group, wherein $R^1$, $R^2$, $R^3$ are each independently of one another an alkyl group, wherein R is hydrogen or methyl, wherein $M^+$ is an alkali metal ion, wherein x is an integral number in the range of 1 to 5, wherein y is an integral number in the range of 0 to 5, and wherein z is an integral number in the range of 1 to 15, and wherein the metal is selected from the group consisting of aluminium, steel, copper, noble metals, and titanium.

20. The apparatus $V_2$ according to claim 19, wherein the liquid absorption medium $A_{VO}$ is an aqueous solution.

21. The apparatus $V_2$ according to claim 20, wherein in the liquid absorption medium $A_{VO}$ a total weight of all compounds of structure (I) and all salts S is in the range from 20.1 wt.-% to 92 wt.-% based on a total weight of the aqueous solution.

22. The apparatus $V_2$ according to claim 19, wherein in the liquid absorption medium $A_{VO}$ ratio of total weight of all compounds of structure (I) to a total weight of all salts S is in the range 1:1000 to 1:10.

23. An absorption chiller, comprising:

the apparatus $V_2$ according to claim 19, a condenser, an evaporator, and a coolant, wherein the coolant is water.

24. An absorption medium $A_{VE}$, comprising:
a mixture of at least one additive selected from the group consisting of compounds of the structure (I)

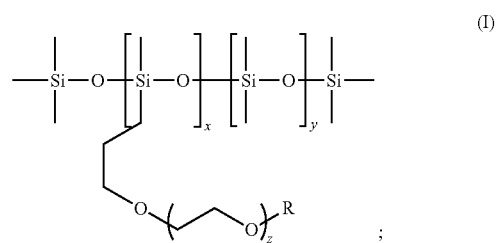

and at least one salt S selected from the group consisting of $Q^+A^-$, $Q^+(R^1O)_2PO_2^-$, $(Q^+)_2R^2OPO_3^{2-}$, and $Q^+M^+ R^3OPO_3^{2-}$, wherein $Q^+$ is a dialkylimidazolium cation, wherein $A^-$ is an anion selected from the group consisting of $R^*COO^-$, $R'SO_3^-$, $HSO_4^-$, and $R''SO_4^-$, wherein $R^*$, $R'$, $R''$, are each independently of one another an alkyl group, wherein $R^1$, $R^2$, $R^3$ are each independently of one another an alkyl group, wherein R is hydrogen or methyl, wherein $M^+$ is an alkali metal ion, and wherein x is an integral number in the range of 1 to 5, wherein y is an integral number in the range of 0 to 5, and wherein z is an integral number in the range of 1 to 15.

25. The absorption medium $A_{VE}$ according to claim 24, wherein the absorption medium is an aqueous solution.

26. The absorption medium $A_{VE}$ according to claim 25, wherein a total weight of all compounds of structure (I) and all salts S is in the range from 20.1 wt.-% to 92 wt.-% based on a total weight of the aqueous solution.

27. The absorption medium $A_{VE}$ according to claim 24, wherein a ratio of a total weight of all compounds of structure (I) to a total weight of all salts S is in the range 1:1000 to 1 10.

28. The absorption medium $A_{VE}$ according to claim 24, wherein the absorption medium is in an absorption chiller.